United States Patent
Hanqing et al.

(10) Patent No.: US 10,233,405 B2
(45) Date of Patent: Mar. 19, 2019

(54) SYSTEM AND METHOD FOR RICE BRAN OIL REFINEMENT

(71) Applicant: Hanqing Chen, Jiangsu (CN)

(72) Inventors: Chen Hanqing, Wuxi (CN); Zhu Xiangcheng, Wuxi (CN)

(*) Notice: Subject to any disclaimer, the term of this patent is extended or adjusted under 35 U.S.C. 154(b) by 58 days.

(21) Appl. No.: 15/308,484

(22) PCT Filed: Sep. 1, 2015

(86) PCT No.: PCT/CN2015/088759
§ 371 (c)(1),
(2) Date: Nov. 2, 2016

(87) PCT Pub. No.: WO2016/034105
PCT Pub. Date: Mar. 10, 2016

(65) Prior Publication Data
US 2017/0166838 A1    Jun. 15, 2017

(30) Foreign Application Priority Data
Sep. 4, 2014 (CN) .......................... 2014 1 0450190

(51) Int. Cl.
| | |
|---|---|
| *C11C 1/10* | (2006.01) |
| *A23D 9/04* | (2006.01) |
| *C11B 3/12* | (2006.01) |
| *C11C 1/08* | (2006.01) |
| *C11C 3/04* | (2006.01) |
| *A23D 9/00* | (2006.01) |
| *C11B 3/00* | (2006.01) |
| *C11B 3/10* | (2006.01) |

(52) U.S. Cl.
CPC .............. *C11C 1/10* (2013.01); *A23D 9/00* (2013.01); *A23D 9/04* (2013.01); *C11B 3/001* (2013.01); *C11B 3/10* (2013.01); *C11B 3/12* (2013.01); *C11C 1/08* (2013.01); *C11C 3/04* (2013.01)

(58) Field of Classification Search
CPC .. C11B 3/00; C11B 3/001; C11C 1/10; A23D 9/00; A23D 9/04
See application file for complete search history.

(56) References Cited

U.S. PATENT DOCUMENTS

| | | | | |
|---|---|---|---|---|
| 4,089,880 | A * | 5/1978 | Sullivan | C11B 3/001 554/176 |
| 4,599,143 | A * | 7/1986 | Stage | B01D 1/065 159/13.4 |
| 2011/0097473 | A1* | 4/2011 | Nakamura | C11B 3/02 426/601 |

* cited by examiner

*Primary Examiner* — Sean E Conley
(74) *Attorney, Agent, or Firm* — Rimon, P.C.

(57) ABSTRACT

This application provides an oil refining system and method, including a water circulation system with a chilled water circulation unit including chilled water equipment and a chilled water pipeline, a hot water circulation unit including hot water equipment and a hot water pipeline, and an ambient temperature water circulation unit including an ambient temperature water pipeline. The oil refining system further includes a deacidification system, deodorization system, and a decoloration system to implement a systematization and automation of oil refining.

10 Claims, 6 Drawing Sheets

SYSTEM AND METHOD FOR RICE BRAN OIL REFINEMENT

SUMMARY

According to one aspect, an oil refining system comprising: a water circulation system, wherein the water circulation system comprises a chilled water circulation unit, a hot water circulation unit, and an ambient temperature water circulation unit, wherein the chilled water circulation unit comprises chilled water equipment and chilled water pipelines, and the chilled water equipment distributing the chilled water into a first chilled water pipeline, a second chilled water pipeline, and a third chilled water pipeline, the hot water circulation unit comprising hot water equipment and hot water pipelines, and the hot water equipment distributing the hot water to a first, a second, a third, and a fourth hot water pipelines, and the ambient temperature water circulation unit comprising ambient temperature water pipelines, the ambient temperature water pipelines comprising a first, a second, a third, a fourth, and a fifth ambient temperature water pipelines and an ambient temperature water loop; a deacidification system; a deodorization system, wherein each of the deacidification system and the deodorization system comprising a preheating unit, an evaporation unit, a first condensing unit, a first conduction oil pipeline and a second conduction oil pipeline; and a decoloration system, wherein the decoloration system comprising a first reheating unit, a first distillation unit, a second condensing unit, a third conduction oil pipeline, and a fourth conduction oil pipeline, the chilled water in the first chilled water pipeline going into the first heat-exchange device, exchanging heat with the hot water coming from the first hot water pipeline to the first heat-exchange device, and then going back to the chilled water equipment for cyclic utilization; the chilled water in the second chilled water pipeline passing through the first condensing unit, condensing the gas generated inside it during the refining process, and going back to the chilled water equipment for cyclic utilization, and the chilled water in the third chilled water pipeline passing through the second condensing unit, condensing the gas generated inside it during the refining process, and going back to the chilled water equipment for cyclic utilization, the hot water in the first hot water pipeline going into the first heat-exchange device, exchanging heat with the chilled water coming from the first chilled water pipeline to the first heat-exchange device and then going back to the hot water equipment for cyclic utilization; the hot water of the second hot water pipeline passing through the second condensing unit, melting the solid materials generated inside it during the condensation of ambient temperature water into liquid, and going back to the hot water equipment for cyclic utilization after the liquid being drained; the hot water in the third hot water pipeline going to the first distillation unit, exchanging heat with the first light component materials generated inside the first distillation unit through distillation, and going back to the hot water equipment for cyclic utilization; and the hot water of the fourth hot water pipeline passing through the first condensing unit, melting the solid materials generated inside it during the condensation of ambient temperature water into liquid, and going back to the hot water equipment for cyclic utilization after the liquid being drained, the ambient temperature water of the first ambient temperature water pipeline supplementing water for the hot water circulation unit after going into the hot water equipment; the ambient temperature water of the second ambient temperature water pipeline going back to the ambient temperature water loop after passing through the evaporation unit, the ambient temperature water of the third ambient temperature water pipeline going back to the ambient temperature water loop after passing through the first condensing unit, the ambient temperature water of the fourth ambient temperature water pipeline going back to the ambient temperature water loop after passing through the first distillation unit, and the ambient temperature water of the fifth ambient temperature water pipeline going back to the ambient temperature water loop after passing through the second condensing unit, the conduction oil in the first conduction oil pipeline passing through the preheating unit, preheating the raw oil, and flowing back to the conduction oil furnace after heat exchange, the conduction oil of the second conduction oil pipeline passing through the evaporation unit, heating up materials inside it, and flowing back to the conduction oil furnace after heat exchange, the conduction oil in the third conduction oil pipeline passing through the first reheating unit, reheating the raw oil, and flowing back to the conduction oil furnace after heat exchange, the conduction oil of the fourth conduction oil pipeline passing through the first distillation unit, heating up materials inside it, and flowing back to the conduction oil furnace after heat exchange, the raw oil going into the evaporation unit after being preheated inside the preheating unit and being separated into the first light component materials and the first heavy component materials, and then the first light component materials going into the first condensing unit, and the first heavy component materials going into the first reheating unit to be heated and separated into the second light component materials and the second heavy component materials after passing through the first distillation unit, and then, the non-condensed gas of the second light component materials going into the second condensing unit.

BRIEF DESCRIPTION OF THE DRAWINGS

In the following, in order to more clearly state the technical scheme of embodiments of the present application, a brief introduction is given to the drawings to be used in the specification of embodiments. Clearly, drawings recited below are just some embodiments of the present application. For ordinary technical personnel in this field, it is also available to get other drawings based on these drawings without performing additional work.

Reference will now be made to the attached drawings, when read in combination with the following specification, wherein like reference numerals refer to like parts throughout the several views, and in which:

FIG. 1 is the structure diagram of the main part of the water circulation system recited in the present application, according to one embodiment;

FIG. 2 is the structure diagram of the main part of the deacidification and deodorization system recited in the present application, according to one embodiment;

FIG. 3 is the structure diagram of the main part of the decoloration system recited in the present application, according to one embodiment;

FIG. 4 is the structure diagram of the main part of the first refinement system recited in the present application, according to one embodiment;

FIG. 5 is the structure diagram of the main part of the second refinement system recited in the present application, according to one embodiment;

FIG. 6 is the structure diagram of the main part of the third refinement system recited in the present application, according to one embodiment.

DETAILED DESCRIPTION

Figure 1:
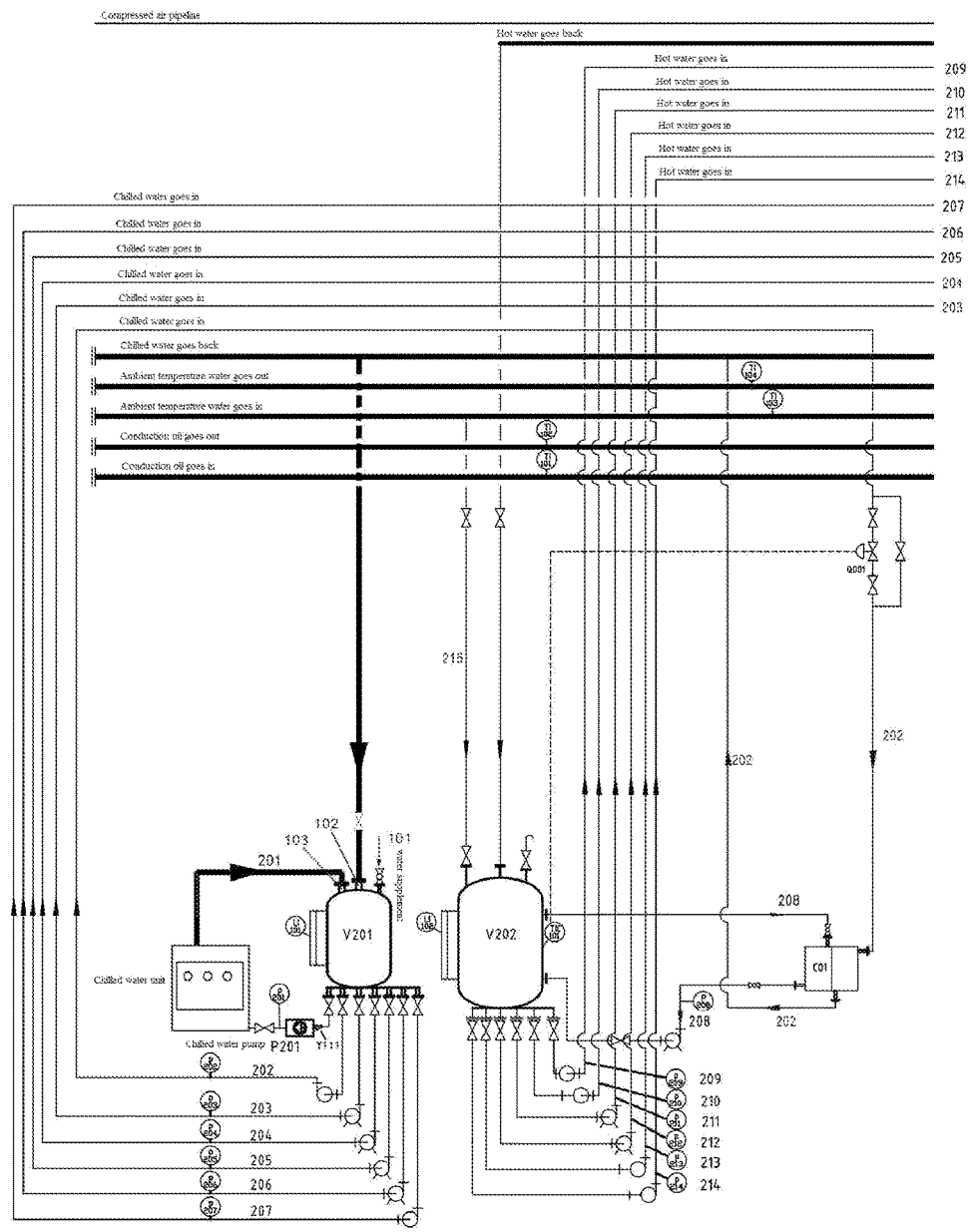
FIG. 1-FIG. 6 are structure diagrams of an oil refining system of the present application, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

This application is directed to the area of animal and vegetable oil refining techniques, which specifically involves an oil refining system, including a method for refining rice bran oil by using this system and producing rice bran oil.

Currently, the oil refining techniques of China are generally traditional chemical or physical refining techniques, mainly comprising five processes, namely, degumming, alkali refining or physical deacidification, decoloration, dewaxing, and deodorization. The equipment used in different processes also varies from one process to another.

For example, methods of deacidification comprise such methods as alkali refining, distillation (physical deacidification), solvent extraction, and esterification, wherein the most widely used methods are alkali refining and distillation (physical deacidification). Alkali refining method is to neutralize the free fatty acids in the oil with alkali in which process soap is generated and then used to adsorb other impurities so as to sediment and separate them from oil. In the oil production industry, caustic soda and sodium carbonate are the common materials used in alkali refining, and another option is to use caustic soda after using sodium carbonate. According to this method, the equipment usually used comprises oil refining caldron, metering pump, disk centrifuge, washing caldron, and dryer. Alkali refining during deacidification will cause consumption of neutral oil as well as generation of large amount of waste water, which will bring loss to enterprises and increase the volume of industrial waste water to be treated, and even cause environmental pollution.

The method of distillation (physical deacidification) is based on the feature that the volatility of triglyceride fatty acids is significantly different from that of free fatty acids (vacuum state), and this method keeps the principle of carrying out vapor distillation at relatively high vacuum degree (residual pressure lower than 266 Pa) and high temperature (240-260° C.) so as to achieve the goal of removing free fatty acids and other volatile substances from the oil. This method can be used to treat oil of high acid value, such as rice bran oil and palm oil. Same as the deodorization equipment, the equipment for distillation and deacidification mainly comprises deodorization towers of plate type, packed type, horizontal tray type, and so on. The advantages of a plate-type tower lie in its moderate investment fee, relatively high heat recovery utilization rate, and convenient maintenance. Due to the unique structure of plate-type deodorization tower, which is that the tower is separated into several layers from the top to the bottom, with each layer being designed with 6-8 partitions. Meanwhile, overflow pipe is set on each layer to keep the oil level between 600 mm and 900 mm. And thus, at the bottom of each tower plate, steam jet needs to both overcome the pressure of the oil layer and guarantee the normal distillation of water vapor, which requires large amount of stripped vapor consumption. Compared with a packed-type deodorization tower, a plate-type tower needs to consume 70-90 kg more vapor when refining lt oil, accompanied by a higher operation cost. If the products are not cooled under a vacuum condition, the quality will decline. It is also impossible to adjust the deodorization duration flexibly. Meanwhile, a long duration of deodorization retention is very likely to cause an increase of peroxide value and the generation of new pigments to the oil inside the deodorization tower. What's worse, it will cause a gradual increase of trans-fatty acids content in the deodorized oil. As proved by test, the contents of trans-fatty acids in the oil will gradually increase along with the increase of deodorization duration at the same deodorization temperature, while this value is proportional to the deodorization temperature within the same deodorization duration. The most prominent advantages of packed-type tower are vapor saving (relatively low amount of required vapor in the use, only about 34% of that used in common plate-type deodorization tower, 0.8-1.3% of the oil weight) and low operation cost. Its other advantages comprise relatively ideal deodorization duration, large production capacity, extremely low neutral oil loss caused by spatter and hydrolyzation; and its disadvantages comprise its serious mixing phenomenon after variety change of oil and high sensitivity to air leakage and oil coking.

Decoloration is to improve the color of the oil, raise oil quality, and provide qualified raw oil for further deodorization and refinement. Another important role of decoloration process is to remove impurities other than pigments. In the process of vegetable oil decoloration, adsorbent is used to absorb the pigments in most cases, and the adsorbing materials are activated carbon, bentonite, attapulgite, and so on, which have a relatively strong selective absorption performance on pigments and other impurities. The commonly used equipment in oil decoloration comprises carclazyte metering tank, carclazyte-oil blending tank, decoloration caldron or tower, catcher, vertical leaf filter, and sump oil tank. During the adsorption decoloration process, usually due to the absorption of adsorbent, the neutral oil will suffer from loss, and meanwhile, some pigments generated due to heat process cannot be removed through such adsorption decoloration.

Deodorization is a process based on the feature that the volatility of odor substances in oil (such as fatty acids, hydrocarbons, aldehydes, ketones, peroxide, etc. with low molecular weight) is largely different from that of triglyceride fatty acids, and in this process, the odor substances are removed by using vapor distillation under the condition of high temperature and high vacuum. Same as distillation deacidification equipment, the deodorization equipment mainly comprises deodorization towers of plate type, packed type, horizontal tray type, and so on. Similar to physical deacidification process, it is very likely to cause the oxidation, pyrolysis, and partial hydrolysis of oil as well as the generation of hazardous substances (such as trans fatty acids and polyglycerol ester) in the deodorization process due to the high treatment temperature (170-260° C.), long heat treatment duration (15-120 min), and direct contact between vapor and oil.

Therefore, it is very important to design and develop refinement equipment and preparation methods suitable for industrial production, ensuring continuous production, and eventually obtaining high quality oil.

The purpose of this section is to summarize some aspects of embodiments of the present application and briefly introduce some example embodiments. In this part, as well as the abstract of the specification and invention name concerning this application, there might be some simplified or omitted information for the purpose of avoiding obscure of the purpose of this part, the abstract of the specification, and title of the present invention, and this kind of simplification or omission cannot be used to limit the scope of the present invention.

Given the problems existing in the above mentioned and/or current oil refining systems, embodiments of the present invention is come up with.

Therefore, one purpose of the present application is to provide an oil refining system, which will effectively realize the systematization and automation of oil refining on the basis of providing brand new technical process.

To solve the above technical problems, the present application puts forward with a technical scheme as follows: an oil refining system, wherein it comprising a water circulation system with a chilled water circulation unit, a hot water circulation unit, and an ambient temperature water circulation unit, wherein the chilled water circulation unit comprising chilled water equipment and chilled water pipelines, the hot water circulation unit comprising hot water equipment and hot water pipelines, and the ambient temperature water circulation unit comprising ambient temperature water pipelines; a deacidification and deodorization system with a preheating unit, an evaporation unit, a first condensing unit, a first conduction oil pipeline and a second conduction oil pipeline; a decoloration system with a first reheating unit, a first distillation unit, a second condensing unit, a third conduction oil pipeline and a fourth conduction oil pipeline; the chilled water equipment distributing the chilled water into a first chilled water pipeline, a second chilled water pipeline, and a third chilled water pipeline, the hot water equipment distributing the hot water to a first, a second, a third, and a fourth hot water pipelines, the ambient temperature water pipelines comprising a first, a second, a third, a fourth, and a fifth ambient temperature water pipelines and an ambient temperature water loop; the chilled water in the first chilled water pipeline going into the first heat-exchange device, exchanging heat with the hot water coming from the first hot water pipeline to the first heat-exchange device and then going back to the chilled water equipment for cyclic utilization; the chilled water in the second chilled water pipeline passing through the first condensing unit, condensing the gas generated inside it during the refining process, and going back to the chilled water equipment for cyclic utilization; and the chilled water in the third chilled water pipeline passing through the second condensing unit, condensing the gas generated inside it during the refining process, and going back to the chilled water equipment for cyclic utilization; the hot water in the first hot water pipeline going into the first heat-exchange device, exchanging heat with the chilled water coming from the first chilled water pipeline to the first heat-exchange device and then going back to the hot water equipment for cyclic utilization; the hot water of the second hot water pipeline passing through the second condensing unit, melting the solid materials generated inside it during the condensation of ambient temperature water into liquid, and going back to the hot water equipment for cyclic utilization after the liquid being drained; the hot water in the third hot water pipeline going to the first distillation unit, exchanging heat with the first light component materials generated inside the first distillation unit through distillation, and going back to the hot water equipment for cyclic utilization; the hot water of the fourth hot water pipeline passing through the first condensing unit, melting the solid materials generated inside it during the condensation of ambient temperature water into liquid, and going back to the hot water equipment for cyclic utilization after the liquid being drained; the ambient temperature water of the first ambient temperature water pipeline supplementing water for the hot water circulation unit after going into the hot water equipment; the ambient temperature water of the second ambient temperature water pipeline going back to the ambient temperature water loop after passing through the evaporation unit; the ambient temperature water of the third ambient temperature water pipeline going back to the ambient temperature water loop after passing through the first condensing unit; the ambient temperature water of the fourth ambient temperature water pipeline going back to the ambient temperature water loop after passing through the first distillation unit; and the ambient temperature water of the fifth ambient temperature water pipeline going back to the ambient temperature water loop after passing through the second condensing unit; the conduction oil in the first conduction oil pipeline passing through the preheating unit, preheating the raw oil, and flowing back to the conduction oil furnace after heat exchange; the conduction oil of the second conduction oil pipeline passing through the evaporation unit, heating up materials inside it, and flowing back to the conduction oil furnace after heat exchange; the conduction oil in the third conduction oil pipeline passing through the first reheating unit, reheating the raw oil, and flowing back to the conduction oil furnace after heat exchange; the conduction oil of the fourth conduction oil pipeline passing through the first distillation unit, heating up materials inside it, and flowing back to the conduction oil furnace after heat exchange; the raw oil going into the evaporation unit after being preheated inside the preheating unit and being separated into the first light component materials and the first heavy component materials, and then the first light component materials going into the first condensing unit, and the first heavy component materials going into the first reheating unit to be heated and being separated into the second light component materials and the second heavy component materials after passing through the first distillation unit, and after that, the non-condensed gas of the second light component materials going into the second condensing unit.

As an example scheme of the oil refining system recited in the present application, wherein it further comprising a first refinement system with a second reheating unit, a second distillation unit, a third condensing unit, a fifth conduction oil pipeline and a sixth conduction oil pipeline; the chilled water equipment also distributing chilled water into a fourth chilled water pipeline, wherein the chilled water of the fourth chilled water pipeline passing through the third condensing unit, condensing the gas generated inside it during the refining process, and going back to the chilled water equipment for cyclic utilization; the hot water equipment also distributing the hot water to a fifth hot water pipeline, and the hot water in the fifth hot water pipeline going to the second distillation unit, exchanging heat with the second light component materials generated inside the second distillation unit through distillation, and going back to the hot water equipment for cyclic utilization; the ambient temperature water pipeline further comprising a sixth ambient temperature water pipeline, and the ambient temperature water of the sixth ambient temperature water pipeline going back to the ambient temperature water loop after passing through the second distillation unit; the conduction oil of the fifth conduction oil pipeline passing through the second reheating unit, reheating materials, and flowing back to the conduction oil furnace after heat exchange; the conduction oil of the sixth conduction oil pipeline passing through the second distillation unit, heating up materials inside it, and flowing back to the conduction oil furnace after heat exchange; the second heavy component materials going into the second reheating unit to be heated and being separated into the third light component materials and the third heavy component materials after passing through the second distillation unit, and then the non-condensed gas of the third light component materials going into the third condensing unit.

As another example scheme of the oil refining system recited in the present application, wherein it further comprising a second refinement system with a third reheating unit, a third distillation unit, a fourth condensing unit, a seventh conduction oil pipeline and an eighth conduction oil pipeline; the chilled water equipment also distributing chilled water into a fifth chilled water pipeline, and the chilled water of this chilled water pipeline passing through the fourth condensing unit, condensing the gas generated inside it during the refining process, and going back to the chilled water equipment for cyclic utilization; the hot water equipment also distributing the hot water to a sixth hot water pipeline, and the hot water in the sixth hot water pipeline going to the third distillation unit, exchanging heat with the third light component materials generated inside the third distillation unit through distillation, and going back to the hot water equipment for cyclic utilization; the ambient temperature water pipeline further comprising a seventh ambient temperature water pipeline, and the ambient temperature water of the seventh ambient temperature water pipeline going back to the ambient temperature water loop after passing through the third distillation unit; the conduction oil of the seventh conduction oil pipeline passing through the third reheating unit, reheating materials, and flowing back to the conduction oil furnace after heat exchange; the conduction oil of the eighth conduction oil pipeline passing through the third distillation unit, heating up materials inside it, and flowing back to the conduction oil furnace after heat exchange; the third heavy component materials going into the third reheating unit to be heated and being separated into the fourth light component materials and the fourth heavy component materials after passing through the third distillation unit, and then, the non-condensed gas of the fourth light component materials going into the fourth condensing unit.

As an example scheme of the oil refining system recited in the present application, wherein it further comprising a third refinement system with a fourth reheating unit, a fourth distillation unit, a fifth condensing unit, a ninth conduction oil pipeline and a tenth conduction oil pipeline; the chilled water equipment also distributing chilled water into a sixth chilled water pipeline, and the chilled water of this chilled water pipeline passing through the fifth condensing unit, condensing the gas generated inside it during the refining process, and going back to the chilled water equipment for cyclic utilization; the hot water equipment also distributing the hot water to a seventh hot water pipeline, and the hot water in the seventh hot water pipeline going to the fourth distillation unit, exchanging heat with the fourth light component materials generated inside the fourth distillation unit through distillation, and going back to the hot water equipment for cyclic utilization; the ambient temperature water pipeline further comprising an eighth ambient temperature water pipeline and the ninth ambient temperature water pipeline, and the ambient temperature water of the eighth ambient temperature water pipeline going back to the ambient temperature water loop after passing through the fourth distillation unit; and the ambient temperature water of the ninth ambient temperature water pipeline going back to the ambient temperature water loop after passing through the second heat-exchange device; the conduction oil of the ninth conduction oil pipeline passing through the fourth reheating unit, reheating materials, and flowing back to the conduction oil furnace after heat exchange; the conduction oil of the tenth conduction oil pipeline passing through the fourth distillation unit, heating up materials inside it, and flowing back to the conduction oil furnace after heat exchange; the fourth heavy component materials going into the fourth reheating unit to be heated and being separated into the fifth light component materials and the fifth heavy component materials after passing through the fourth distillation unit, and then, the non-condensed gas of the fifth light component materials going into the fifth condensing unit.

As an example scheme of the oil refining system recited in the present application, wherein the deacidification and deodorization system further comprising a first vacuum device coupled to the first condensing unit; the decoloration system further comprising a second vacuum device coupled to the second condensing unit; the first refinement system further comprising a third vacuum device coupled to the third condensing unit; the second refinement system further comprising a fourth vacuum device coupled to the fourth condensing unit; and the third refinement system further comprising a fifth vacuum device coupled to the fifth condensing unit.

As an example scheme of the oil refining system recited in the present application, wherein the chilled water equipment comprising a chilled water tank, a chilling unit, and an inner-loop chilled water pipeline, wherein, the chilled water tank being set with a water supplement end and a backwater end, and the incoming water going into the chilled water tank through the water supplement end, and then the water inside the chilled water tank being chilled in the chilling unit by passing through the inner-loop chilled water pipeline.

As an example scheme of the oil refining system recited in the present application, wherein the evaporation unit comprising a film evaporator and a first heavy-phase receiving tank, the conduction oil of the second conduction oil pipeline going into the film evaporator, heating up materials inside it, and flowing back to the conduction oil furnace after heat exchange, and the raw oil passing through the evaporation unit and being separated into the first light component materials and the first heavy component materials, and then the first heavy component materials going into the first heavy-phase receiving tank.

As an example scheme of the oil refining system recited in the present application, wherein the first condensing unit comprising a first condenser, a first cold trap, and a first light-phase receiving tank, wherein the first cold trap and the first condenser being coupled to each other, available to enhance the condensation of the first condenser, and at this moment, the third ambient temperature water pipeline branching into a first branch and a second branch of this pipeline, and after the ambient temperature water of the first branch going into the first condenser and the raw oil being separated to get the first light component materials by going in the evaporation unit, the water exchanging heat with such materials and condensing them into liquid, and then, the water going back to the ambient temperature water loop after the liquid going into the first light-phase receiving tank; the ambient temperature water of the second branch going back to the ambient temperature water loop after passing through the first cold trap; the hot water of the fourth hot water pipeline passing through the first condenser, melting the solid materials generated inside it during the condensation of ambient temperature water into liquid, and going back to the hot water equipment for cyclic utilization after the liquid being drained; the chilled water in the second chilled water pipeline passing through the first cold trap, condensing the gas generated inside it during the refining process, and going back to the chilled water equipment for cyclic utilization.

As an example scheme of the oil refining system recited in the present application, wherein the first distillation unit comprising a first molecular still, a second heavy-phase receiving tank and a second light-phase receiving tank, and the conduction oil of the fourth conduction oil pipeline going into the first molecular still, heating up materials inside it, and flowing to the conduction oil furnace after heat exchange, and the raw oil passing through the distillation unit and being separated into the second heavy component materials and the second light component materials, which going into the second heavy-phase receiving tank and the second light-phase receiving tank respectively.

As an example scheme of the oil refining system recited in the present application, wherein the oil refining system also comprising an auto-control system with a compressed air pipeline; a first pneumatic valve set on the first chilled water pipeline and before the heat-exchange device; a first sensing thermometer on the hot water equipment; a second pneumatic valve set on the first conduction oil pipeline and before the preheating unit; a second sensing thermometer on the preheating unit; a third pneumatic valve set on the second conduction oil pipeline and before the evaporation unit; the third sensing thermometer set on the evaporation unit; a fourth pneumatic valve set on the third conduction oil pipeline and before the first reheating unit; a fourth sensing thermometer set on the first reheating unit; a fifth pneumatic valve set on the fourth conduction oil pipeline and before the first distillation unit; and a fifth sensing thermometer set on the first distillation unit; the compressed air pipeline being coupled to the first, the second, the third, the fourth, and the fifth pneumatic valves respectively, all of which being started up with compressed air of the compressed air pipeline; the first, the second, the third, the fourth, and the fifth sensing thermometers being available to send signals, which being collected by the control device, and then the control device sending control instructions to the first, the second, the third, the fourth, and the fifth pneumatic valves as per the preset program for regulating the flow volume of chilled water and/or conduction oil and for controlling the temperature eventually.

Another purpose of the present application is to provide a method for refining rice bran oil.

To solve the above technical problems, the present application proposes a rice bran oil refinement method as a technical scheme, wherein, step one, heating the grade 4 rice bran oil or dewaxed and degummed rice bran oil up to 160-190° C. by letting it pass through the preheating unit, then sending it to the evaporation unit, and distributing it evenly on the evaporation surface with the distributing device inside the evaporation unit, and the temperature on the evaporation surface reaching 190-220° C., and the temperature of the first light component materials dropping to 5-25° C. after the materials passing the first condensing unit, and then they flowing to the first light-phase receiving tank, and the first heavy component materials going into the first heavy-phase receiving tank directly, with the vacuum degree of the deacidification and deodorization system being within 10-100 Pa; step two, heating the materials in the first heavy-phase receiving tank up to 220-230° C. by letting them pass through the first reheating unit, then sending them to the first distillation unit, and distributing them evenly on the evaporation surface with the distributing device inside the first distillation unit, and the temperature on the evaporation surface reaching 230-260° C., and the temperature of the second light component materials dropping to 30-45° C. after the materials passing the condenser inside the first distillation unit, and then they flowing to the second light-phase receiving tank, and the second heavy component materials going into the second heavy-phase receiving tank directly, with the vacuum degree of the decoloration system being within 0.5-1 Pa; step three, the first refinement process: heating the materials in the second heavy-phase receiving tank up to 230-260° C. by letting them pass through the second reheating unit, then sending them to the second distillation unit for refinement, and distributing the materials evenly on the evaporation surface with the distributing device inside the second distillation unit, and the temperature on the evaporation surface reaching 280-300° C., and the temperature of the third light component materials dropping to 30-45° C. after the materials passing the condenser inside the second distillation unit, and then they flowing to the third light-phase receiving tank, and the third heavy component materials going into the third heavy-phase receiving tank directly, with the vacuum degree of the first refinement system being within 0.5-1 Pa; step four, the second refinement process: heating the materials in the third heavy-phase receiving tank up to 230-260° C. by letting them pass through the third reheating unit, then sending them to the third distillation unit for refinement, and distributing the materials evenly on the evaporation surface with the distributing device inside the third distillation unit, and the temperature on the evaporation surface reaching 300-310° C., and the temperature of the fourth light component materials dropping to 30-45° C. after the materials passing the condenser inside the third distillation unit, and then they flowing to the fourth light-phase receiving tank, and the fourth heavy component materials going into the fourth heavy-phase receiving tank directly, with the vacuum degree of the second refinement system being within 0.1-1 Pa; step five, the third refinement process: heating the materials in the fourth heavy-phase receiving tank up to 230-260° C. by letting them pass through the fourth reheating unit, then sending them to the fourth distillation unit for refinement, and distributing the materials evenly on the evaporation surface with the distributing device inside the fourth distillation unit, and the temperature on the evaporation surface reaching 310-318° C., and the temperature of the fifth light component materials dropping to 30-45° C. after the materials passing the condenser inside the fourth distillation unit, and then they flowing to the fifth light-phase receiving tank, and the fifth heavy component materials going into the fifth heavy-phase receiving tank directly, with the vacuum degree of the third refinement system being within 0.1-1 Pa; step six, pumping the materials inside the third, and/or the fourth, and/or the fifth light-phase receiving tank(s) to the winterization tank, heating them up to 32-35° C. under the stirring status, then crystallizing them by lowering their temperature to 12-15° C. at a cooling rate within 1.5-2° C./h and then lowering their temperature to 3° C. at a cooling rate within 0.3-0.5° C./h, and after that, growing crystal for 14 h at a constant temperature of 3° C., and then using winterization filtering machine to filter them with the filtration pressure ≤0.2 Mpa, and after the process of winterization degreasing, refined rice bran oil going to be obtained.

As an example scheme of the rice bran oil refinement method recited in the present application, wherein the dewaxing method of the dewaxed and degummed rice bran oil being that: pumping the crude rice bran oil to the winterization tank after filtering it, heating it up to 75-80° C. under the stirring status, then crystallizing it by lowering its temperature to 20-25° C. at a cooling rate within 2-4° C./h, and after that, growing crystal for 14 h at a constant temperature, and then using winterization filtering machine to filter it and get dewaxed oil; the degumming method of the dewaxed and degummed rice bran oil being that: heating the crude rice bran oil up to 80-90° C., adding 80-85% phosphoric acid (mass percent) or 50-55% citric acid solution (mass percent) which weighing 0.05-0.20% of the crude rice bran oil, and after that, making them mix and react strongly, and then keeping the reaction lasting for 10-25 min, then adding 90-97° C. hot water with oil weight of 1-10%, carrying out centrifugal separation after fully blending the solution for 5-20 min, and then removing the aqueous phase, and later, after the degummed oil being dried under a vacuum condition of 30-300 Pa, the degummed rice bran oil going to be obtained.

Another purpose of the present application is to provide a kind of rice bran oil.

To solve the above technical problems, the present application proposes the following technical scheme: a kind of rice bran oil wherein oryzanol taking up 0.5-2.0% of the rice bran oil in terms of mass percent, and in the composition of fatty acids, the saturated fatty acids accounting for 16-27% and the unsaturated fatty acids accounting for 63.5-85%.

As an example scheme of the rice bran oil recited in the present application, wherein the composition of the oryzanol comprising 24-methylenecycloartanol ferulic acid ester, methylenecycloartanol ferulic acid ester, campesterol ferulic acid ester, cycloartanol ferulic acid ester, β-sterol ferulic acid ester, and cyclofurfuryl alcohol ferulic acid ester.

As an example scheme of the rice bran oil recited in the present application, wherein the saturated fatty acids being palmitic acid and stearic acid.

As an example scheme of the rice bran oil recited in the present application, wherein the unsaturated fatty acids being oleic acid, linoleic acid, and linolenic acid.

As an example scheme of the rice bran oil recited in the present application, wherein the oleic acid accounting for 35-49% in terms of the mass percent, linoleic acid accounting for 28-43%, and linolenic acid accounting for 0.5-3.0%.

As an example scheme of the rice bran oil recited in the present application, wherein, as tested by 133.4 mm-slot of Lovibond tintometer, its color being that: red ≤4.0 and yellow ≤35.

As an example scheme of the rice bran oil recited in the present application, wherein, as tested by 133.4 mm-slot of Lovibond tintometer, its color being that: 1.4≤red ≤3.2 and 15≤yellow ≤32.

As an example scheme of the rice bran oil recited in the present application, wherein, oryzanol accounting for 1-2.0% of rice bran oil in terms of the mass percent.

The present application may achieve the following beneficial effects:

1. Environmentally Friendly and Pollution-Free:

(1) This application, based on the physical and chemical characteristics of the materials, separates components of materials by adjusting the pressure and temperature by means of the oil refining system;

(2) During the refining process of the system, no additives or auxiliaries are needed.

2. Improve the Quality of Rice Bran Oil, and Increase the Profit of the Enterprise:

(1) Since the system adopts pure physical method when designing the process, it may largely ensure no loss of oryzanol composition of the rice bran oil;

(2) The whole system adopts full automatic control in the whole process, completely eradicating the disturbance of human factors to oil quality;

(3) In the refining process of the system, it may extract pigments, unsaturated triglyceride fatty acids, saturated triglyceride fatty acids, and free fatty acids from the oil separately and sell them as per their usage, so as to increase profits of an enterprise.

3. Clean Production:

The whole system is largely airtight, preventing the oil from running off, going out, dripping, or leaking.

EXAMPLE EMBODIMENTS

To make the above purposes, features and advantages of the present application clearer and more understandable, detailed description is given to the example embodiments of the present application based on the drawings attached in the specification.

The following contents describe many details for a full understanding of the present application. Nonetheless, the present application is also available to be implemented in ways other than those mentioned here. Technical personnel in this field can perform similar promotion without prejudice to connotation of the present application. Therefore, the present application is not subject to the specific embodiments stated herein.

Secondly, the present application gives detailed description based on diagrams. For the convenience of specification, the diagrams showing components, equipment or equipment structures will not be zoomed in partially as per the general scale during the detailing process for the embodiments of the present application. Meanwhile, such diagrams will only serve as embodiments, which should not limit the scope protected by the present application. In addition, three-dimensional sizes in terms of length, width, and depth shall be provided in the practical production.

Again, the present application, to express names of components and equipment in a brief manner, in descriptions marked with drawings in the specifications, the names expressed in the generic part of the patent claims are all universal names currently applied in the technical field, and detailed distinction will not be further given. For example, "the first reheater", "the second reheater", and so on are called "reheater" collectively.

At last, the "embodiment" or "embodiments" stated here refers to specific features, structures, or peculiarities at least in one embodiment of the present application. The expressions of "in one embodiment" used in different places of the specification refer to neither one same embodiment nor a single or selected embodiment mutually exclusive with other embodiments.

As shown in FIG. 1-6:

| Drawing mark | Name |
| --- | --- |
| V201 | Chilled water tank |
| P201-P208 | Chilled water pump |

-continued

| Drawing mark | Name |
| --- | --- |
| V202 | Hot water tank |
| P209-P214 | Hot water pump |
| G101 | Basket filter |
| Y101-Y111 | Y-type filter |
| P101 | Feeding pump |
| H101 | Preheater |
| H102 | Film evaporator |
| H103, H106 | Condenser |
| H104, H108, H111, H114 | Reheater |
| H105, H109, H112, H115 | Molecular still |
| H107, H110, H113, H116, H117 | Cold trap |
| V101, V103, V105, V107, V109 | Heavy-phase receiving tank |
| V102, V104, V106, V108, V110 | Light-phase receiving tank |
| Z101-Z105 | Buffer tank |
| ZP101-ZP105 | Vacuum unit |
| P215-P219 | Conduction oil circulating pump |
| P102-P112 | Material pump |
| p101-p112, p201-p219 | Pressure gauge |
| QD01-QD11 | Pneumatic control valve |
| ⋈ | Ball valve |
| ⅌ | Butterfly valve |
| ⊗ | Stop valve |
| ⊗ | Check valve |
| BY01 | Oval gear flowmeter |
| FIC101, FIC102, FIC104, FIC106, FIC108 | Sensing metal tube rotameter |
| FI103, FI105, FI107 | Metal tube rotameter |
| TI101-TI104 | Thermometer |
| TIC101-TIC111 | Sensing thermometer |
| LI101, LI102 | Liquidometer |
| LIC101-LIC110 | Sensing liquidometer |
| ZI101-ZI105 | Vacuum meter |
| C01, C02 | Heat exchanger |

In this embodiment, the present application provides a sort of oil refining system, comprising water circulation system 100, deacidification and deodorization system 200, decoloration system 300, the first refinement system 400, the second refinement system 500, and the third refinement system 600.

In this system, the water circulation system 100 comprises a chilled water circulation unit, a hot water circulation unit, and an ambient temperature water circulation unit.

The chilled water circulation unit comprises chilled water equipment and chilled water pipelines, wherein the "chilled water" going back to the chilled water equipment after heat exchange (the currently so-called "chilled water" is the water after heat exchange, the temperature of which is higher than that required by the oil refining system after heat exchange) and the water supplemented from the outside to the chilled water equipment are both chilled by the chilled water equipment and then distributed to each chilled water pipeline for cyclic utilization. This embodiment gives a specific situation wherein the chilled water equipment comprises chilled water tank V201, a chilling unit, chilled water pump P201 and inner-loop chilled water pipeline 201; the chilled water tank V201 comprises water supplement end 101, backwater end 102, water inlet 103 as well as liquidometer LI101, and the incoming water goes into the chilled water tank V201 by passing through water supplement end 101, then becomes chilled water by being chilled when going through chilling unit via inner-loop chilled water pipeline 201, and then enters chilled water tank V201 through water inlet 103, and after that, the chilled water is distributed to the first chilled water pipeline 202, the second chilled water pipeline 203, the third chilled water pipeline 204, the fourth chilled water pipeline 205, the fifth chilled water pipeline 206, and the sixth chilled water pipeline 207.

Judging from the circulation of chilled water:

the chilled water of the first chilled water pipeline 202 passes through the first heat-exchange device, and in this embodiment, the first heat-exchange device is heat exchanger C01, and heat exchanger C01 exchanges heat with the hot water coming from the first hot water pipeline 208 to the heat exchanger C01, then, the temperature of the hot water entering the heat exchanger C01 is stabilized within the temperature scope needed by the system, and then, it goes back to the chilled water tank V201 and becomes chilled water after being chilled in the chilling unit for cyclic utilization;

the chilled water in the second chilled water pipeline 203 goes into the first cold trap H117 and is used as the heat exchange medium of the first cold trap H117 to condense the small amount of gas generated inside H117 in the refining process so as to ensure the vacuum degree of the whole oil refining system within the set scope, and then it becomes chilled water by being chilled by the chilling unit after going back to the chilled water tank V201 for cyclic utilization;

the chilled water in the third chilled water pipeline 204 goes into the second cold trap H107 and is used as the heat exchange medium of the second cold trap H107 to condense the small amount of gas generated inside H107 in the refining process so as to ensure the vacuum degree of the whole oil refining system within the set scope, and then it becomes chilled water by being chilled by the chilling unit after going back to the chilled water tank V201 for cyclic utilization;

the chilled water in the fourth chilled water pipeline 205 goes into the third cold trap H110 and is used as the heat exchange medium of the third cold trap H110 to condense the small amount of gas generated inside H110 in the refining process so as to ensure the vacuum degree of the whole oil refining system within the set scope, and then it becomes chilled water by being chilled by the chilling unit after going back to the chilled water tank V201 for cyclic utilization;

the chilled water in the fifth chilled water pipeline 206 goes into the fourth cold trap H113 and is used as the heat exchange medium of the fourth cold trap H113 to condense the small amount of gas generated inside H113 in the refining process so as to ensure the vacuum degree of the whole oil refining system within the set scope, and then it becomes chilled water by being chilled by the chilling unit after going back to the chilled water tank V201 for cyclic utilization;

the chilled water in the six chilled water pipeline 207 goes into the fifth cold trap H116 and is used as the heat exchange medium of the fifth cold trap H116 to condense the small amount of gas generated inside H116 in the refining process so as to ensure the vacuum degree of the whole oil refining system within the set scope, and then it becomes chilled water by being chilled by the chilling unit after going back to the chilled water tank V201 for cyclic utilization.

Chilled water pump is set on each chilled water pipeline so as to ensure the effective circulation of chilled water, and in this embodiment, particularly, the first chilled water pipeline 202 is also set with the first pneumatic valve QD01, which is started up by means of the compressed air pipeline, and of course, bypass is set on both sides of the first pneumatic valve QD01 to ensure stable and safe subsequent working procedures and avoid the breakdown of the first pneumatic valve QD01 from hindering the cyclic utilization of the chilled water in the first chilled water pipeline 202.

The hot water circulation unit comprises hot water equipment and hot water pipelines, and in this embodiment, the hot water equipment, namely the hot water tank V202 shown in FIG. 1, supplements water through the first ambient temperature water pipeline 215, and then distributes it to all other hot water pipelines for cyclic utilization, and in this embodiment, the hot water tank V202 is also equipped with liquidometer LI102 and the first sensing thermometer TIC101, the latter one of which can send signals, with the signals being collected by the control device, and then the control device sends control instructions (the pneumatic valve being started up by the compressed air within the compressed air pipeline) to the first pneumatic valve QD01 of the system as per the preset program so as to regulate the flow volume of chilled water and control the temperature.

Figure 3:
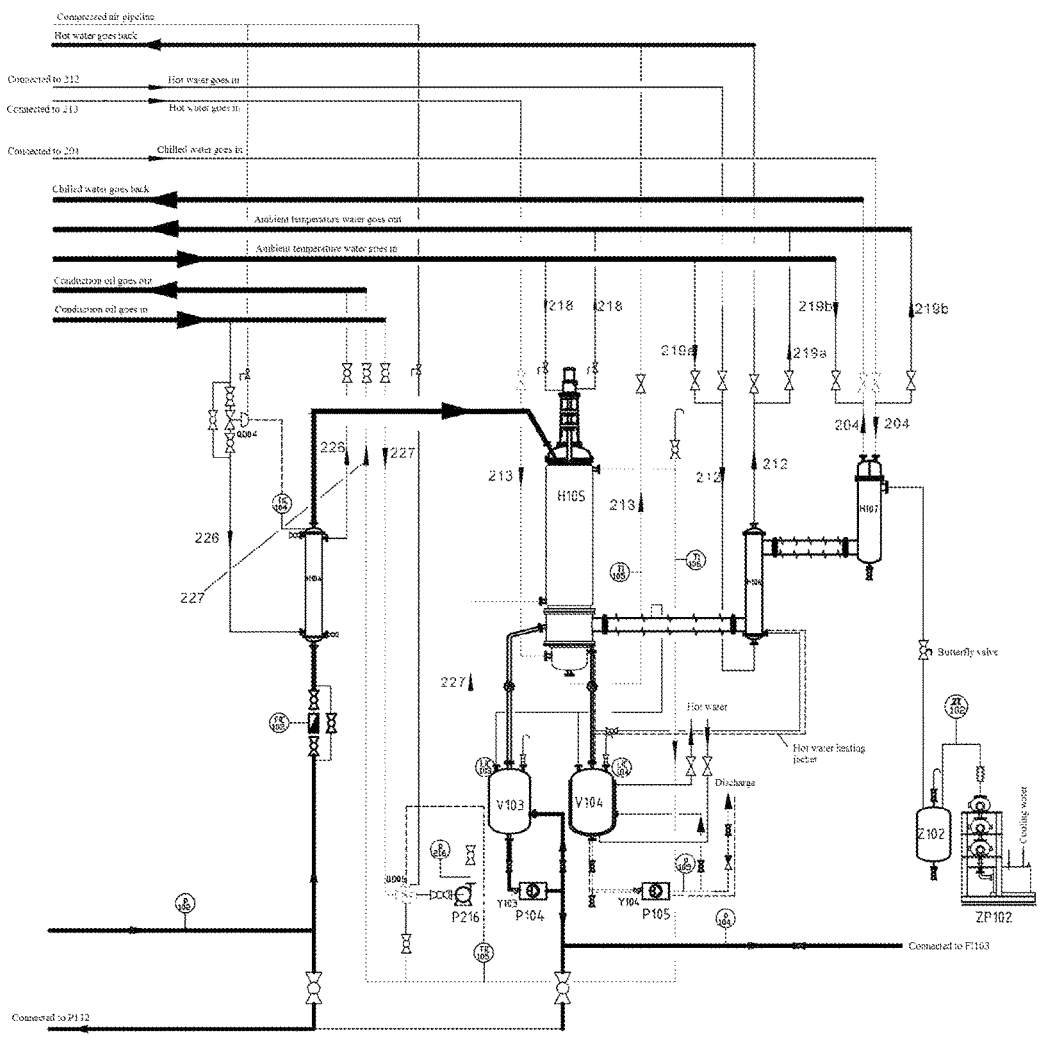
Figure 4:
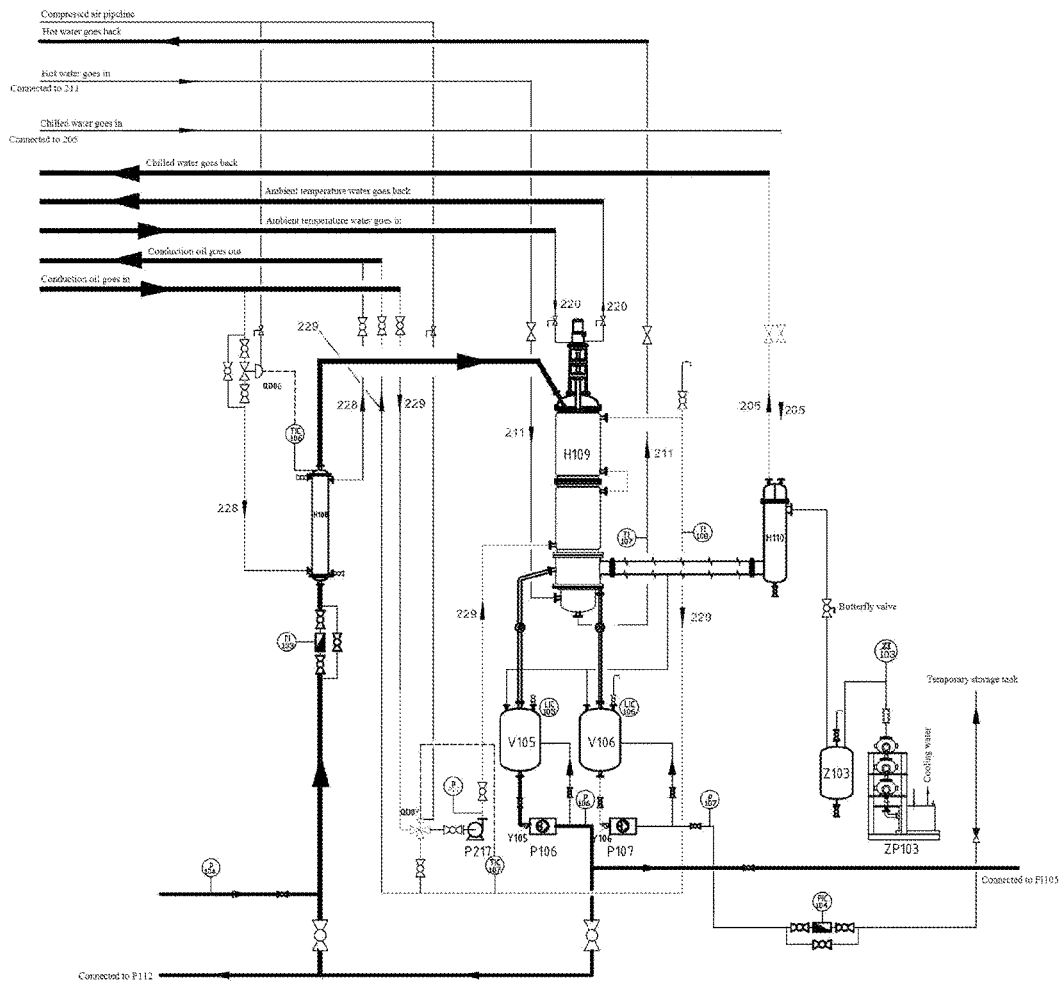
Figure 5:
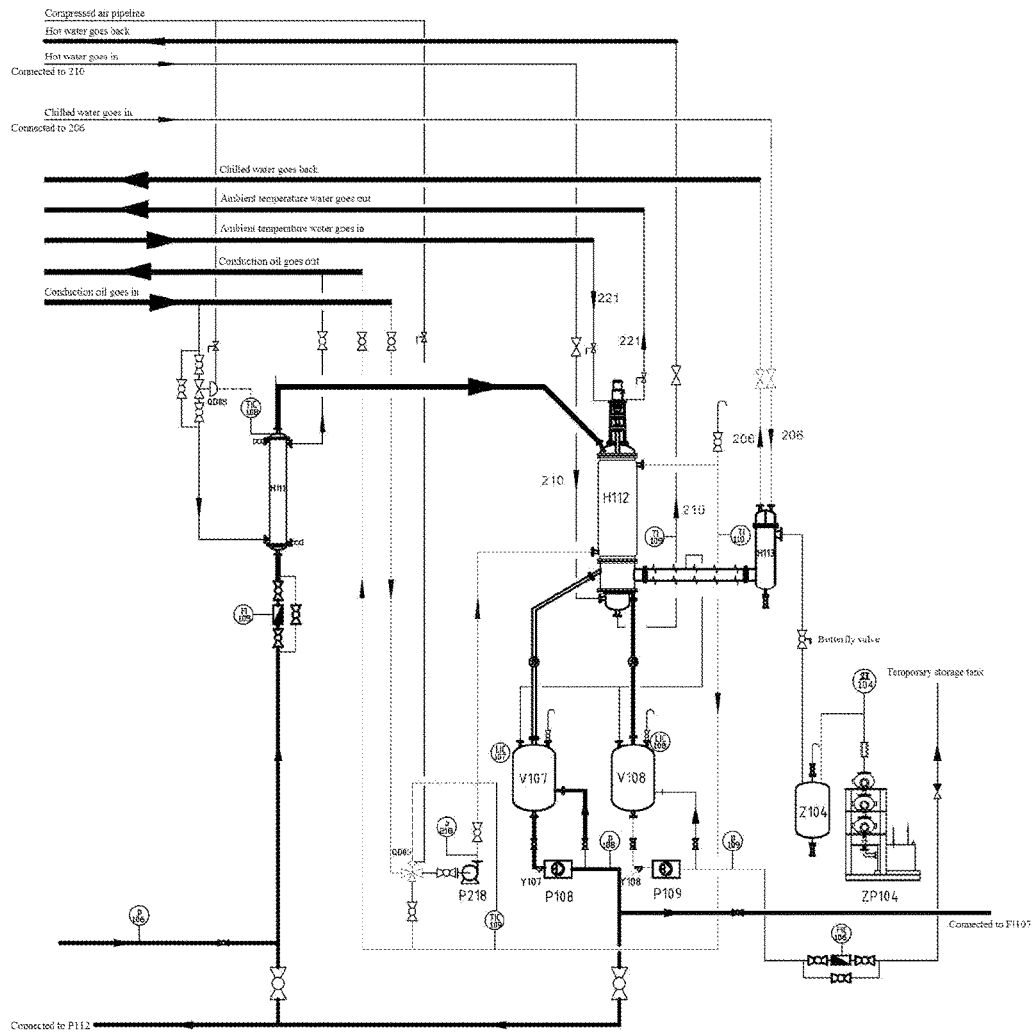
Figure 6:
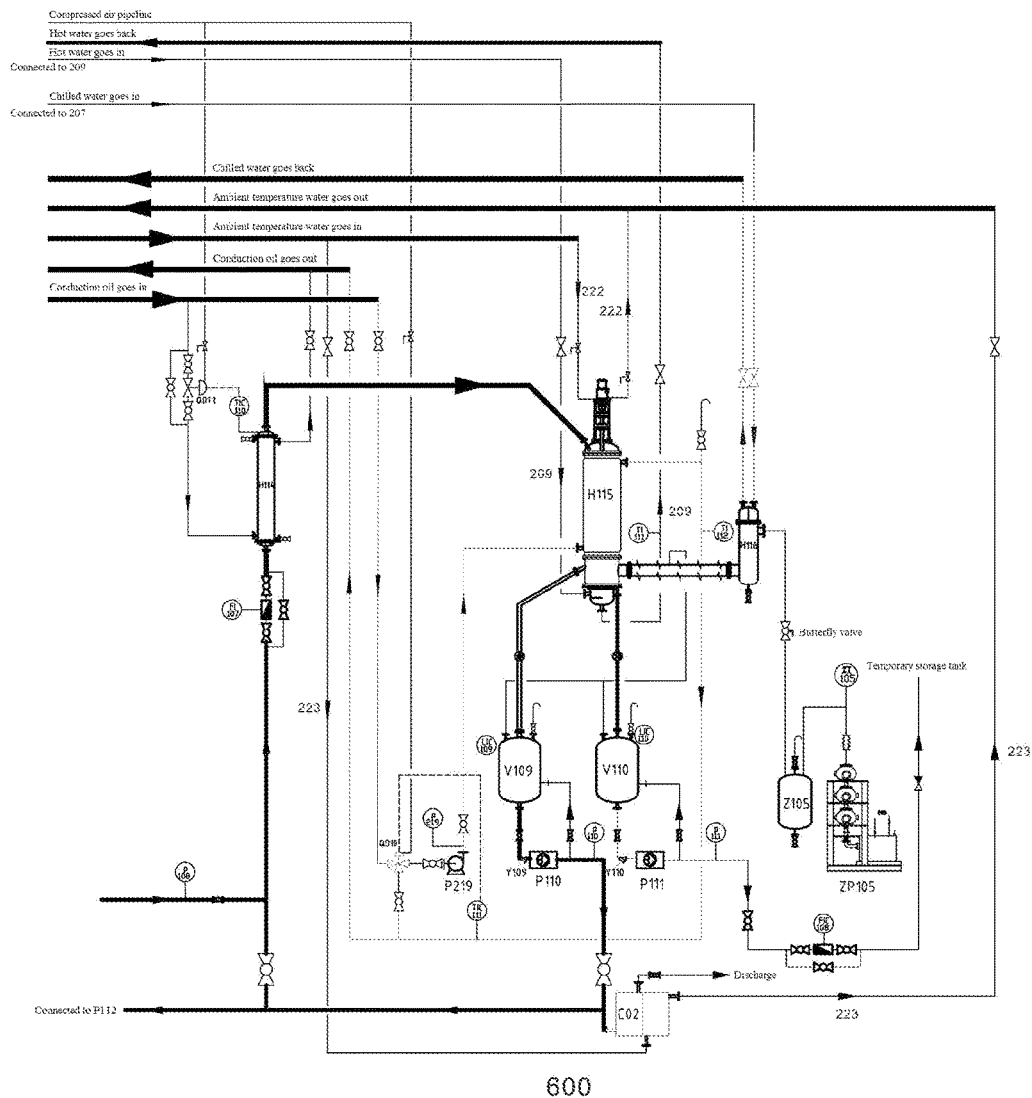

Judging from the circulation of hot water:

the hot water of the first hot water pipeline 208 passes through the first heat-exchange device, which is the heat exchanger C01 shown in FIG. 1, and exchanges heat with the chilled water coming from the first chilled water pipeline 202 to the heat exchanger C01, then, the temperature of the hot water is stabilized within the temperature scope needed by the system, and then, it goes back to the hot water tank V202 for cyclic utilization;

after the hot water of the second hot water pipeline 212 passes through the second condenser H106 of the second condensing unit, it melts the solid materials generated inside it during the condensation of ambient temperature water into liquid, which means that the hot water provided by the second hot water pipeline 212 is used as heat exchange medium here for rinsing condensed solid of the second condenser H106, and then the water goes back to the hot water tank V202 for cyclic utilization;

after the hot water of the third hot water pipeline 213 exchanges heat with the first light component materials gained through distillation inside the first molecular still H105 by passing through the first molecular still H105 in the first distillation unit (as shown in FIG. 3), it becomes water with temperature higher than "hot water" in the original hot water tank V202, and then goes back to the hot water tank V202 for cyclic utilization;

after the hot water of the fourth hot water pipeline 214 passes through the first condenser H103 of the first condensing unit, it melts the solid materials generated inside it during the condensation of ambient temperature water into liquid and then, the liquid is drained, which means that the hot water provided by the fourth hot water pipeline 214 is used as heat exchange medium here for rinsing the condensed solid of the first condenser H103 and then returns to the hot water tank V202 for cyclic utilization;

after the hot water of the fifth hot water pipeline 211 exchanges heat with the second light component materials gained through distillation inside the second molecular still H109 by passing through the second molecular still H109 in the second distillation unit (as shown in FIG. 4), it becomes water with temperature higher than "hot water" in the original hot water tank V202, and then goes back to hot water tank V202 for cyclic utilization;

after the hot water of the sixth hot water pipeline 210 exchanges heat with the third light component materials gained through distillation inside the third molecular still H112 by passing through the third molecular still H112 in the third distillation unit (as shown in FIG. 5), it becomes water with temperature higher than "hot water" in the original hot water tank V202, and then goes back to hot water tank V202 for cyclic utilization;

after the hot water of the seventh hot water pipeline 209 exchanges heat with the fourth light component materials gained through distillation inside the fourth molecular still H115 by passing through the fourth molecular still H115 in the fourth distillation unit (as shown in FIG. 6), it becomes water with temperature higher than "hot water" in the original hot water tank V202, and then goes back to hot water tank V202 for cyclic utilization.

Thus, the hot water tank V202 supplements water through the first ambient temperature water pipeline 215, and then its temperature goes up after the water exchanges heat in the internal condensers of the molecular stills. To control the temperature of hot water within a proper scope, it is necessary to exchange heat with the chilled water in the first chilled water pipeline 202 by means of the first heat exchanger C01, and in the embodiment, the automatic control system is adopted, with the first sensing thermometer TIC101 on the hot water tank V202 being used to measure temperature and send signals, which, then, are collected by the control device, then the control device sends control instructions to the first pneumatic valve QD01 (started up with compressed air) as per the preset program to regulate the flow volume of chilled water of the first chilled water pipeline 202, so as to control the temperature of the hot water.

The ambient temperature water circulation unit comprises ambient temperature water pipelines, wherein the ambient temperature water pipelines comprise the first ambient temperature water pipeline 215, the second ambient temperature water pipeline 216, the third ambient temperature water pipeline 217, the fourth ambient temperature water pipeline 218, the fifth ambient temperature water pipeline 219, the sixth ambient temperature water pipeline 220, the seventh ambient temperature water pipeline 221, the eighth ambient temperature water pipeline 222, the ninth ambient temperature water pipeline 223, and the ambient temperature water loop.

Figure 2:
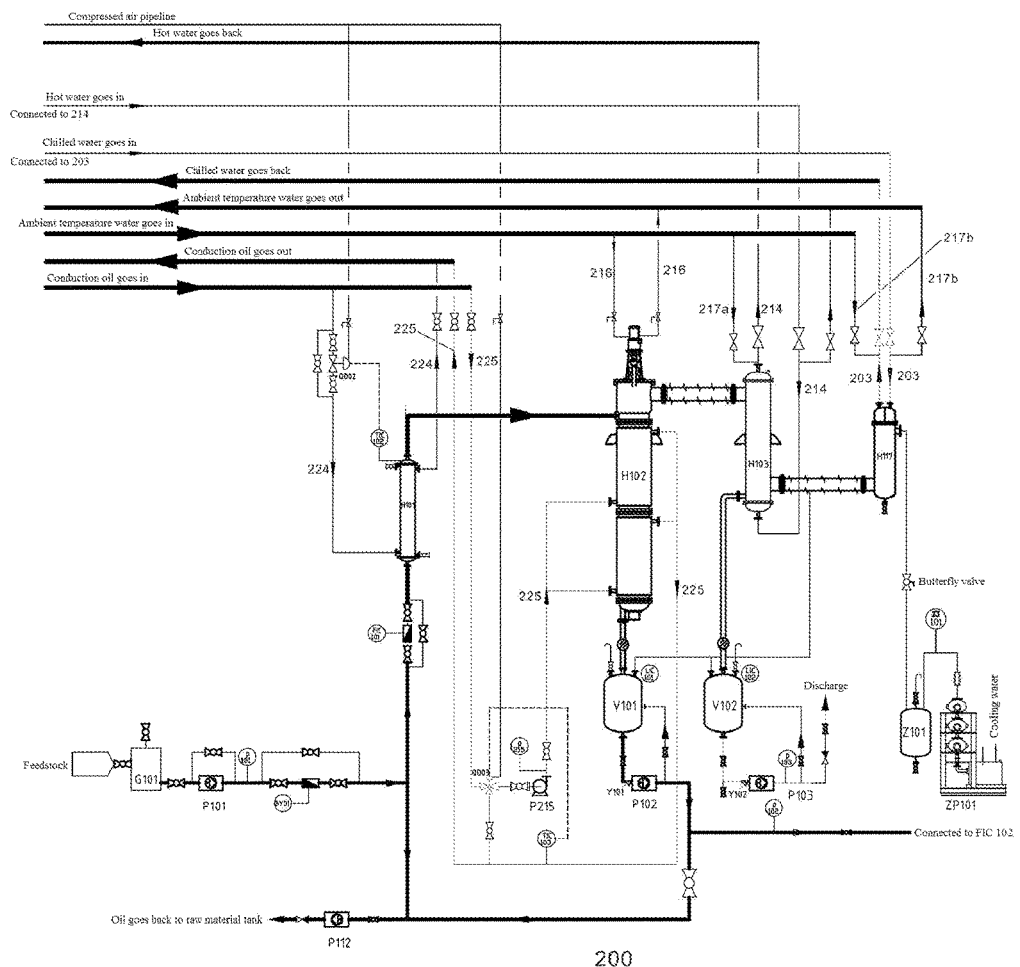

Judging from the circulation of ambient temperature water:

the ambient temperature water of the first ambient temperature water pipeline 215 enters the hot water tank V202 for supplementing water for the hot water circulation unit;

the ambient temperature water of the second ambient temperature water pipeline 216 enters the film evaporator H102 (as shown in FIG. 2) in evaporation unit and goes back to ambient temperature water loop after lowering the temperature of the mechanical seal of the deceleration machine equipped in film evaporator H102;

the third ambient temperature water pipeline 217 comprises the first branch 217a and the second branch 217b of this pipeline, and the ambient temperature water of the first branch 217a goes into the first condenser H103 and the raw oil is separated to get the first light component materials within the film evaporator H102, then the water exchanges heat with such materials and condenses them into liquid, and goes back to the ambient temperature water loop after the liquid goes into the first light-phase receiving tank V102, and the ambient temperature water of the second branch 217b goes in to the first cold trap H117, and the ambient temperature water is used as heat exchange medium here for rinsing the condensed solid so that the solid generated due to condensation of chilled water in the second chilled water pipeline 203 can be melt into liquid to be drained, then it goes back to ambient temperature water loop, and in the embodiment, the first cold trap H117 is coupled to the first condenser H103 so that the condensation of the first condenser H103 can be enhanced;

the ambient temperature water of the fourth ambient temperature water pipeline 218 enters the first molecular still H105 (as shown in FIG. 3) in the first distillation unit and goes back to the ambient temperature water loop after lowering the temperature of the mechanical seal of the deceleration machine equipped in the first molecular still H105;

the fifth ambient temperature water pipeline 219 comprises the first branch 219a and the second branch 219b of this pipeline, and the ambient temperature water of the first branch 219a goes into the second condenser H106 and serves as the heat exchange medium for the non-condensed gas existing in the second light component materials generated through the separation in the first molecular still H105 and condenses them into liquid, and then the water goes back to the ambient temperature water loop, and after the ambient temperature water of the second branch 219b goes into the second cold trap H107, it serves as heat exchange medium for the rinsing of the condensed solid so that the solid generated due to condensation of chilled water in the third chilled water pipeline 204 can be melt into liquid to be drained, after which, it goes back to ambient temperature water loop;

the ambient temperature water of the sixth ambient temperature water pipeline 220 enters the second molecular still H109 (as shown in FIG. 4) in the second distillation unit and goes back to the ambient temperature water loop after lowering the temperature of the mechanical seal of the deceleration machine equipped in the second molecular still H109;

the ambient temperature water of the seventh ambient temperature water pipeline 221 enters the third molecular still H112 (as shown in FIG. 5) in the third distillation unit and goes back to the ambient temperature water loop after lowering the temperature of the mechanical seal of the deceleration machine equipped in the third molecular still H112;

the ambient temperature water of the eighth ambient temperature water pipeline 222 enters the fourth molecular still H115 (as shown in FIG. 6) in the fourth distillation unit and goes back to the ambient temperature water loop after lowering the temperature of the mechanical seal of the deceleration machine equipped in the fourth molecular still H115;

the ambient temperature water of the ninth ambient temperature water 223 enters the second heat-exchange device as shown in FIG. 6, wherein it comprises the second heat exchanger C02, and serves as the heat exchange medium of the second heat exchanger C02 to lower the temperature of materials in the fifth heavy-phase receiving tank V109 to a proper degree after the materials go through the second heat exchanger C02, during which process, thermal oxidation is avoided, and then the water goes back to the ambient temperature water loop, and at this moment, the specific process of heat exchange is that: first, open the valve on the pipeline leading to the fifth heavy-phase receiving tank V109, and start up material pump P110, and when there are materials flowing back to the fifth heavy-phase receiving tank V109, it means that the pressure in the pipeline becomes balanced, then, open the valve on the pipeline along the material discharging direction and coupled to the second heat exchanger C02, and close the valve on the pipeline leading to the fifth heavy-phase receiving tank V109, which can make the materials in the fifth heavy-phase receiving tank V109 enter the second heat exchanger C02, and exchange heat with the ambient temperature water in the ninth ambient temperature water 223, and after the materials reach the specific temperature, they are discharged, in which, there is mainly triglyceride fatty acids with large molecular weight, and the discharged materials can be sold as by-products.

As for this embodiment, the coming in and out of ambient temperature water is not achieved in a closed system, and its purposes involve four aspects: 1. to lower temperature of the mechanical seal of the deceleration machine; 2. to serve as heat exchange medium of condensers (H103, H106) so as to condense the gas in the condensers into liquid after heat exchange; 3. to serve as heat exchange medium for the rinsing of condensed solid in cold trap to melt condensed solid into liquid to be drained; 4. to serve as heat exchange medium of the second heat exchanger C02 to lower the temperature of materials in the fifth heavy-phase receiving tank V109 to a proper temperature after such materials pass through the second heat exchanger C02, with thermal oxidation being avoided.

It shall be noted that, in this embodiment, considering the industrial operation cost, film evaporator H102 (as shown in FIG. 2) is used in the evaporation unit as the deacidification and deodorization device in the process of oil refining. Its principle is that: materials enter the film evaporator H102 over its heating zone along the radial direction and are distributed on the heating wall surface of film evaporator H102 by distributing device, and then the rotary film scraper scrapes the materials on the heating surface into continuous liquid film with even thickness and pushes them downwards spirally. During this process, the rotary film scraper ensures high-velocity turbulence generated by the continuous and even liquid film and prevents the film from coking or scaling on the heating surface so as to raise the transmission coefficient, and the first light component materials are evaporated and form steam to rise, and then go through vapor-liquid separator to enter the external condenser (that is, the first condenser H103 in FIG. 2) directly coupled to film evaporator H102; the first heavy component materials are discharged from the cone at the bottom of film evaporator H102 and enter the first heavy-phase receiving tank V101. And of course, here, it is also available to substitute film evaporator H102 with molecular still to reach same or similar technical effects.

Deacidification and deodorization system 200, as shown in FIG. 2, comprises a preheating unit, an evaporation unit, a first condensing unit, a first conduction oil pipeline and a second conduction oil pipeline.

In this embodiment, the preheating unit heats the raw oil going into the system first with preheater H101 so as to reduce the energy consumption of raw oil in the subsequent refining process. The evaporation unit adopts film evaporator H102 (shown in FIG. 2) as the deacidification and deodorization device in the process of oil refining, with film evaporator H102 being set with the first heavy-phase receiving tank V101 at the bottom, and the first heavy component materials collected enter the decoloration system 300. The first condensing unit comprises the first condenser H103 and the first cold trap H117 which are coupled to each other, with the function of enhancing the condensation of the first condenser H103 being provided. The first light component materials obtained in film evaporator H102 can be exchanged heat in the first condenser H103 and become liquid, and then the liquid enters the first light-phase receiving tank V102 and is collected as by-product to be discharged to the by-product collection tank and be used as raw material of oil and fat chemical.

In the deacidification and deodorization system 200, judging from the circulation of the conduction oil:

the conduction oil in the first conduction oil pipeline 224 goes through the preheater H101 and preheats the raw oil as the heat exchange medium of preheater H101, and then the conduction oil goes back to the conduction oil furnace after heat exchange;

the conduction oil of the second conduction oil pipeline 225 goes through film evaporator H102 and serves as the heat exchange medium of film evaporator H102 to raise the temperature of the thin film materials on the internal wall of film evaporator H102 to a specific temperature, and then the conduction oil goes back to the conduction oil furnace after heat exchange. In this embodiment, as shown in FIG. 2, conduction oil in the second conduction oil pipeline 225 is split into two branches both before and after going through the film evaporator H102, and the branches are set because the heating zone of this film evaporator H102 is separated into two parts, into both of which the conduction oil needs to go.

In this embodiment, the second pneumatic valve QD02 is set on the first conduction oil pipeline 224 and is started up with the compressed air in the compressed air pipeline, so as to ensure the stability and safety of the subsequent working process. Bypass is set on both sides of the second pneumatic valve QD02 so as to avoid the breakdown of the second pneumatic valve QD02 from hindering the cyclic utilization of the conduction oil in the first conduction oil pipeline 224. The second sensing thermometer TIC102 is set on the preheater H101 and is available to send signals which are collected by the control device, and then the control device sends control instructions to the second pneumatic valve QD02 as per the preset program to regulate the flow volume of the conduction oil, so as to control the temperature.

With film evaporator H102 as a node, the second conduction oil pipeline 225 is split into the front section and back section, with the third pneumatic valve QD03 set on the front section and the third sensing thermometer TIC103 set on the back section, and the third sensing thermometer TIC103 can send signals which are collected by the control device, and then the control device sends control instructions to the third pneumatic valve QD03 as per the preset program to regulate the flow volume of the conduction oil, so as to control the temperature.

In the deacidification and deodorization system 200, judging from the process of refining the raw oil:

the raw oil is separated into the first light component materials and the first heavy component materials in the film evaporator H102 after being preheated by the preheater H101, and then the first light component materials go into the first condenser H103, where it is exchanged heat and condensed into liquid, then the liquid goes into the first light-phase receiving tank V102 and is discharged into the by-product collection tank eventually; the first heavy component materials go into the first heavy-phase receiving tank V101 under the film evaporator H102, with the first heavy component materials collected going into the decoloration system 300 of the next working process.

As shown in FIG. 2, in this embodiment, the raw oil, before being preheated in preheater H101, goes into basket filter G101 with such impurities as tiny mechanical impurities and metal debris in the raw oil of this pipeline being filtered, and it can protect the feeding pump P101 coupled to the back of the basket filter G101 and avoid the feeding pump P101 from being damaged by the import of impurities. And then, raw oil after filtered passes through oval gear flowmeter BY01 and sensing metal tube rotameter FIC101, with the flow volume being measured, and then it goes into preheater H101 to be preheated. At this moment, one valve is set on the inlet, outlet, and bypass pipeline of the oval gear flowmeter BY01 and sensing metal tube rotameter FIC101 respectively, which is for the purpose of that: in normal production process, the valves of the inlet and outlet are open but that of the bypass pipeline is off; in the equipment overhaul or maintenance process, the valves of the inlet and outlet are off, and if the valve of the bypass pipeline is opened, the materials remaining in the equipment coupled can flow out smoothly; when the relevant flowmeter is being replaced, the three valves are off, which can prevent the materials in the pipeline and the equipment it connects from flowing out and causing loss.

It shall be noted that, in the following system pipelines, Y-type filters Y101-Y111 play the same role with the basket filter G101, with the purpose of filtering impurities contained in the materials in relevant pipelines, and they also protect the material pumps P102-P112 coupled to the back of Y-type filters Y101-Y111 and avoid the material pump from being damaged by the import of impurities. Meanwhile, one valve is also set on the inlet, outlet and bypass pipeline of the sensing metal tube rotameters FIC102, FIC104, FIC106, and FIC108 as well as the metal tube rotameters FI103, FI105, and FI107 respectively, the purpose of which is same as the operation of setting one valve on the inlet, outlet, and bypass pipeline of the oval gear flowmeter BY01 and sensing metal tube rotameter FIC101 respectively and are not repeated again.

Of course, in this embodiment, the system is also set with the pipeline leading oil back to the raw material tank, and this pipeline is coupled to the raw oil feeding pipeline and the first heavy-phase receiving tank V101 for the convenience of overhaul of the system pipeline.

The deacidification and deodorization system 200 is also set with the first vacuum device, wherein it comprises vacuum unit ZP101, and the first vacuum unit ZP101 is coupled to the first cold trap H117 through the first buffer tank Z101. Before the raw oil is led into it, the whole system needs to be vacuumized to a negative pressure state for the convenience of refining oil.

To ensure the smooth discharge of materials from the first heavy-phase receiving tank V101 under vacuum condition, the specific operation in the practical production is as follows: first, open the valve on the pipeline leading back to the first heavy-phase receiving tank V101, then start up material pump P102, and when there are materials flowing back to the first heavy-phase receiving tank V101, it means that the pressure in the pipeline becomes balanced, then, open the valve on the pipeline along the material discharging direction and close the valve on the pipeline leading back to the first heavy-phase receiving tank V101, which can discharge the materials in the first heavy-phase receiving tank V101 smoothly.

To ensure the smooth discharge of materials from the first light-phase receiving tank V102 under vacuum condition, the specific operation is as follows: first, open the valve on the pipeline leading back to the first light-phase receiving tank V102, then start up the material pump P103. When there are materials flowing back to the first light-phase receiving tank V102, it means that the pressure in the pipeline becomes balanced, then, open the valve on the pipeline along the material discharging direction and close the valve on the pipeline leading back to the first light-phase receiving tank V102, which can discharge the materials in the first light-phase receiving tank V102 smoothly.

In this embodiment, as shown in FIG. 2, both the first heavy-phase receiving tank V101 and the first light-phase receiving tank V102 are coupled to the pipeline between the first condenser H103 and the first cold trap H117, with a vacuum-balanced pipeline being set, so that the vacuum degree of the whole system is at the same value.

Decoloration system 300, as shown in FIG. 3, comprises a first reheating unit, a first distillation unit, a second condensing unit, a third conduction oil pipeline and a fourth conduction oil pipeline.

In this embodiment, the first reheating unit reheats the first heavy component materials going into the decoloration system 300 with the first reheating unit H104, so as to ensure the temperature of the first heavy component materials in the subsequent refining process, and the first distillation unit comprises the first molecular still H105 (as shown in FIG. 3) which serves as the decoloration device in the process of oil refining. On the lower part of the first molecular still H105, there is set with the second heavy-phase receiving tank V103, with the second heavy component materials collected entering the first refinement system 400 of the next process through the transmission pipeline; on the lower part of the first molecular still H105, there is also set with the second light-phase receiving tank V104, with the second light component materials (mainly pigments) being exchanged heat and condensed into liquid by the condensation equipment inside the first molecular still H105, and then the liquid goes into the second light-phase receiving tank V104 and be collected to the by-product tank as by-products. The second condensing unit comprises the second condenser H106 and the second cold trap H107 which are coupled to each other, with the function of enhancing the condensation of the second condenser H106 being provided, and the purpose of setting the second condenser H106 and the second cold trap H107 here to connect to the first molecular still H105 is to further condense the small amount of gas in the second light component materials that has not been condensed by the condensation equipment of the first molecular still H105, so as to meet the strict requirements of the whole system on vacuum degree.

In the decoloration system 300, judging from the circulation of the conduction oil:

the conduction oil in the third conduction oil pipeline 226, after passing through the first reheater H104, serves as the heat exchange medium of the first reheater H104 to reheat the first heavy component materials entering the decoloration system 300 and then goes back to the conduction oil furnace after heat exchange;

the conduction oil of the fourth conduction oil pipeline 227 goes through the first molecular still H105 and serves as the heat exchange medium of the first molecular still H105 to raise the temperature of the thin film materials on the internal wall of the first molecular still H105 to a specific temperature, and then the conduction oil goes back to the conduction oil furnace after heat exchange.

In this embodiment, the fourth pneumatic valve QD04 is set on the third conduction oil pipeline 226 and is started up with the compressed air in the compressed air pipeline, so as to ensure the stability and safety of the subsequent working process. Bypass is set on both sides of the fourth pneumatic valve QD04 so as to avoid the breakdown of the fourth pneumatic valve QD04 from hindering the cyclic utilization of the conduction oil in the third conduction oil pipeline 226. The fourth sensing thermometer TIC104 is set on the first reheater H104 and is available to send signals which are collected by the control device, and then the control device sends control instructions to the fourth pneumatic valve QD04 as per the preset program to regulate the flow volume of the conduction oil, so as to control the temperature.

With the first molecular still H105 as a node, the fourth conduction oil pipeline 227 is split into the front section and back section, with the fifth pneumatic valve QD05 set on the front section and the fifth sensing thermometer TIC105 set on the back section, and the fifth sensing thermometer TIC105 can send signals which are collected by the control device, and then the control device sends control instructions to the fifth pneumatic valve QD05 as per the preset program to regulate the flow volume of the conduction oil, so as to control the temperature.

In the decoloration system 300, judging from the process of refining the first heavy component materials:

the first heavy component materials are separated into the second light component materials (mainly pigments) and the second heavy component materials in the first molecular still H105 after being preheated by the first reheater H104, and then the second light component materials are condensed into liquid by the condensation equipment inside the first molecular still H105, and then the liquid goes into the second light-phase receiving tank V104 below the first molecular still H105 and is collected into the by-product collection tank as by-products eventually; the second heavy component materials go into the second heavy-phase receiving tank V103 under the first molecular still H105, with the second heavy component materials collected going into the first refinement system 400 of the next working process.

The decoloration system 300 is also set with the second vacuum device, wherein it comprises vacuum unit ZP102, and the second vacuum unit ZP102 is coupled to the second cold trap H107 through the second buffer tank Z102. Its purpose is to form a negative pressure state by vacuumizing the whole system before refining the oil, so as to facilitate the refining process.

To ensure the smooth discharge of materials from the second heavy-phase receiving tank V103 under vacuum condition, the specific operation in the practical production is as follows: first, open the valve on the pipeline leading back to the second heavy-phase receiving tank V103, then start up material pump P104. When there are materials flowing back to the second heavy-phase receiving tank V103, it means that the pressure in the pipeline becomes balanced, then, open the valve on the pipeline along the material discharging direction and close the valve on the pipeline leading back to the second heavy-phase receiving tank V103, which can discharge the materials in the second heavy-phase receiving tank V103 smoothly.

To ensure the smooth discharge of materials from the second light-phase receiving tank V104 under vacuum condition, the specific operation is as follows: first, open the valve on the pipeline leading back to the second light-phase receiving tank V104, then start up the material pump P105. When there are materials flowing back to the second light-phase receiving tank V104, it means that the pressure in the pipeline becomes balanced, then, open the valve on the pipeline along the material discharging direction and close the valve on the pipeline leading back to the second light-phase receiving tank V104, which can discharge the materials in the second light-phase receiving tank V104 smoothly.

In this embodiment, as shown in FIG. 3, both the second heavy-phase receiving tank V103 and the second light-phase receiving tank V104 are coupled to the pipeline between the second condenser H106 and the second cold trap H107, with a vacuum-balanced pipeline being set, so that the vacuum degree of the whole system is at the same value.

Specially, a hot water heating jacket is set on the pipeline between the second condenser H106 and the second light-phase receiving tank V104, and such heating jacket also set on the pipeline between the first molecular still H105 and the second light-phase receiving tank V104 as well as the pipeline discharging the materials of the second light-phase receiving tank V104 through the material pump P105, and in this embodiment, this hot water heating jacket is used to ensure the flow of the condensed second light component materials (mainly pigments) through these pipelines as liquid so as it can be discharged through material pump P105. On the outer wall of the second light-phase receiving tank V104, there is also set with a hot water heating jacket, with hot water flowing into the jacket, the purpose of which is also to ensure the existence of the condensed second light component materials in the form of liquid so as to facilitate its discharge through material pump P105.

In this embodiment, the decoloration system 300 is also set with pipeline leading oil back to the raw material tank, and this pipeline is coupled to the first heavy component materials feeding pipeline and the second heavy-phase receiving tank V103 for the convenience of overhaul of the system pipeline.

The first refinement system 400 comprises the second reheating unit, the second distillation unit, the third condensing unit, the fifth conduction oil pipeline and the sixth conduction oil pipeline.

In this embodiment, the second reheating unit reheats the second heavy component materials going into the first refinement system 400 with the second reheating unit H108, so as to reduce the energy consumption of the second heavy component materials in the subsequent refining process, and the second distillation unit comprises the second molecular still H109 (as shown in FIG. 4) which serves as the first refinement device in the process of oil refining. On the lower part of the second molecular still H109, there is set with the third heavy-phase receiving tank V105, with the third heavy component materials collected entering the second refinement system 500 of the next process through the transmission pipeline; on the lower part of the second molecular still H109, there is also set with the third light-phase receiving tank V106, with the third light component materials (namely, oil after the first refinement) being exchanged heat and condensed into liquid by the condensation equipment inside the second molecular still H109, and then the materials go into the third light-phase receiving tank V106 and are collected to the temporary storage tank as products (or semi-finished products), and in the case of different materials, the oil collected from V106 in the need of being dewaxed or degreased (such as rice bran oil) is semi-finished product, and the one not necessarily to be dewaxed is finished product. The third condensing unit comprises the third cold trap H110 which is coupled to the second molecular still H109, with the function of supporting the condensation of the second molecular still H109 being provided. The purpose of setting the third cold trap H110 here to connect to the second molecular still H109 is to further condense the small amount of gas in the third light component materials that has not been condensed by the condensation equipment of the second molecular still H109, so as to meet the strict requirements of the whole system on vacuum degree.

In the first refinement system 400, judging from the circulation of the conduction oil:

the conduction oil in the fifth conduction oil pipeline 228, passing through the second reheater H108, serves as the heat exchange medium of the second reheater H108 to reheat the second heavy component materials entering the first refinement system 400 and then goes back to the conduction oil furnace after heat exchange;

the conduction oil of the six conduction oil pipeline 229 goes through the second molecular still H109 and serves as the heat exchange medium of the second molecular still H109 to raise the temperature of the thin film materials on the internal wall of the second molecular still H109 to a specific temperature, and then the conduction oil goes back to the conduction oil furnace after heat exchange.

In this embodiment, the sixth pneumatic valve QD06 is set on the fifth conduction oil pipeline 228 and is started up with the compressed air in the compressed air pipeline, so as to ensure the stability and safety of the subsequent working process. Bypass is set on both sides of the sixth pneumatic valve QD06 so as to avoid the breakdown of the sixth pneumatic valve QD06 from hindering the cyclic utilization of the conduction oil in the fifth conduction oil pipeline 228. The sixth sensing thermometer TIC106 is set on the second reheater H108 and is available to send signals which are collected by the control device, and then the control device sends control instructions to the sixth pneumatic valve QD06 as per the preset program to regulate the flow volume of the conduction oil, so as to control the temperature.

With the second molecular still H109 as a node, the sixth conduction oil pipeline 229 is split into the front section and back section, with the seventh pneumatic valve QD07 set on the front section and the seventh sensing thermometer TIC107 set on the back section, and the seventh sensing thermometer TIC107 can send signals which are collected by the control device, and then the control device sends control instructions to the seventh pneumatic valve QD07 as per the preset program to regulate the flow volume of the conduction oil, so as to control the temperature.

In the first refinement system 400, judging from the process of refining the second heavy component materials:

the second heavy component materials are separated into the third light component materials (namely, oil after the first refinement) and the third heavy component materials in the second molecular still H109 after being preheated by the second reheater H108, and then the third light component materials are condensed into liquid by the condensation equipment inside the second molecular still H109, and the liquid goes into the third light-phase receiving tank V106 below the second molecular still H109, with the finished product or the semi-finished product being stored in the temporary storage tank; the third heavy component materials go into the third heavy-phase receiving tank V105 under the second molecular still H109, with the third heavy component materials collected going into the second refinement system 500 of the next working process.

The first refinement system 400 is also set with the third vacuum device, wherein it comprises vacuum unit ZP103, and the third vacuum unit ZP103 is coupled to the third cold trap H110 through the third buffer tank Z103. Its purpose is to form a negative pressure state by vacuumizing the whole system before refining the oil, so as to facilitate the refining process.

To ensure the smooth discharge of materials from the third heavy-phase receiving tank V105 under vacuum condition, the specific operation in the practical production is as follows: first, open the valve on the pipeline leading back to the third heavy-phase receiving tank V105, then start up material pump P106. When there are materials flowing back to the third heavy-phase receiving tank V105, it means that the pressure in the pipeline becomes balanced, then, open the valve on the pipeline along the material discharging direction and close the valve on the pipeline leading back to the third heavy-phase receiving tank V105, which can discharge the materials in the third heavy-phase receiving tank V105 smoothly.

To ensure the smooth discharge of materials from the third light-phase receiving tank V106 under vacuum condition, the specific operation is as follows: first, open the valve on the pipeline leading back to the third light-phase receiving tank V106, then start up the material pump P107. When there are materials flowing back to the third light-phase receiving tank V106, it means that the pressure in the pipeline becomes balanced, then, open the valve on the pipeline along the material discharging direction and close the valve on the pipeline leading back to the third light-phase receiving tank V106, which can discharge the materials in the third light-phase receiving tank V106 smoothly.

In this embodiment, as shown in FIG. 4, both the third heavy-phase receiving tank V105 and the third light-phase receiving tank V106 are coupled to the pipeline between the second molecular still H109 and the third cold trap H110, with a vacuum-balanced pipeline being set, so that the vacuum degree of the whole system is at the same value.

In this embodiment, the first refinement system 400 is also set with pipeline leading oil back to the raw material tank, and this pipeline is coupled to the second heavy component materials feeding pipeline and the third heavy-phase receiving tank V105 for the convenience of overhaul of the system pipeline.

The refinement degree varies with the category of the oil, and in this embodiment, a kind of oil refining system also comprises the second refinement system 500 and the third refinement system 600. The equipment, pipelines, and design principle of the second refinement system 500 and the third refinement system 600 are same as those used in the first refinement system 400, which, thus, are not be repeated here. For the detailed description, FIGS. 5 and 6 of the drawings of the specification, as well as the specification of the first refinement system 400, can be referenced.

It shall be noted that, the third refinement system 600 is also set with the second heat-exchange device as shown in FIG. 6, which comprises the second heat exchanger C02. The ambient temperature water of the ninth ambient temperature water 223 lowers the temperature of the materials in the fifth heavy-phase receiving tank V109 to a proper temperature when the materials pass through the second heat exchanger C02, avoiding thermal oxidation, then it goes back to the ambient temperature water loop, the detailed description of which is shown in ambient temperature water circulation unit.

To enhance the production efficient and ensure the final quality of the product, the oil refining system of the present application adopts the automatic control. The automatic system mainly comprises onsite devices and control devices (that is DCS general control part in this embodiment).

The onsite devices mainly comprise gauges for measuring temperature, pressure, liquid level, flow, and/or so on. Generally, meters for onsite instructions and teletransmission integration shall be used, which are installed on the onsite equipment and/or pipeline. Onsite devices reflect onsite situation to the control device via (analog quantity/switching quantity/communication and so on) signals.

The control device mainly consists of upper computer, programmable controller (PLC), and so on. The signals sent by the onsite devices are collected by the upper computer or PLC which sends the control instructions to the onsite control valve and so on as per the preset program and display such relevant information as the actual liquid level of each equipment, actual flow of pipeline, temperature and/or pressure status of equipment, and on and/or off status of each valve on the upper computer and save important parameters automatically. After upper/lower limit and other parameters are set on the upper computer, the alarm is given from the general control room or on the site.

The present application mainly involves automatic control of three aspects:

First is temperature, and the sensing thermometers TIC101-TIC111 send signals, which are collected by the upper computer or PLC, and then the upper computer or PLC sends control instructions to the onsite pneumatic valves QD01-QD11 (started up with compressed air) as per the preset program to regulate the flow volume of the chilled water/conduction oil (in which, the first pneumatic valve QD01 regulates the flow of the chilled water), so as to control the temperature.

Second is liquid level, the signals of which are sent by sensing liquidometers LIC101-LIC110. Generally, a liquidometer is installed on the receiving tank and/or storing tank to reflect the situation of materials in such a tank, and the sensing liquidometer in the automatic control system adopts onsite instructions/teletransmission integration, with its power being supplied by the general control, and the sensing liquidometer transmits the onsite liquid level to the control device by means of signals (analog quantity/switching quantity/communication and so on), with the corresponding automatic valves being controlled by the control device as per preset program (parameters). Meanwhile, the actual liquid level is shown on the computer screen, and it is also available to set the onsite alarms for the receiving tank and/or storing tank such as upper/lower limits.

Third is flow, the signals of which are sent by the sensing metal tube rotameters FIC101, FIC102, FIC104, FIC106, and FIC108. A flowmeter is installed on a material pipeline to reflect the situation of material transfer during the production process. Most of the flowmeters in the automatic control system adopt onsite instructions/teletransmission integration, with the power being supplied by the control device, and the flowmeter transmits the onsite flow change to the control device by means of signals (analog quantity/pulse value/communication and so on), with the corresponding automatic valves being controlled by the control device as per preset program (parameters) so as to stabilize the flow; meanwhile, the actual flow value is shown on the computer screen, and it is also available to set the onsite alarms for upper/lower limits of the flow in each pipeline.

The progress of the process varies somewhat with the category of the raw oil, and therefore, in another embodiment, an oil refining system only comprises water circulation system 100, deacidification and deodorization system 200, decoloration system 300, and/or the first refinement unit 400 and/or the second refinement unit 500, which is similar to the above description and thus is not repeated here.

Meanwhile, it will be appreciated by those of ordinary skill in the art that it's practicable to exchange the order of the deacidification and deodorization system 200 and the decoloration system 300 in this system provided by the inventor. However, it may be more reasonable to deacidify and deodorize the raw oil first since the temperature needed by decoloration is higher than the deacidification and deodorization in the process of refining oil, which is also covered in the protection scope of the present application.

The measurement methods of rice bran oil produced by the above oil refining system are as follows:

Determination of Oryzanol:

Refer to Q/CYWMW0100-2013 Rice bran oil—Determination of oryzanol.

Determination of Oil Color:

Refer to GB/T 22460-2008 Animal and vegetable fats and oils—Determination of Lovibond color Determination of Fatty Acids Content in Vegetable Oil, and Preparation of Fatty Acids Methyl Esters:

Refer to GB/T 17376-2008 Animal and vegetable fats and oils-preparation of fatty acids methyl esters Gas Chromatography Analysis of Fatty Acids Methyl Esters:

Refer to GB/T17377-2008 Animal and vegetable fats and oils—Gas chromatography analysis of fatty acids methyl esters.

Embodiment 1

As show in FIG. 2-6, the dewaxed and degummed rice bran oil containing 2.2% oryzanol passes through the preheating unit, namely, preheater H101, and the raw oil entering the system is heated up to 160° C. first, then it goes into the evaporation unit, namely, film evaporator H102, to be distributed evenly on the evaporation surface with the distributing device inside the film evaporator H102, with the temperature of the evaporation surface being at 190° C., and the temperature of the first light component materials drops to 30° C. after the materials pass the first condenser H103 of the first condensing unit, and then they flow to the first light-phase receiving tank V102, after which, they will be discharged through material pump P103; and the first heavy component materials go into the first heavy-phase receiving tank V101 directly, with the vacuum degree of the deacidification and deodorization system 200 being within 10-100 Pa.

The first heavy component materials in the first heavy-phase receiving tank V101 go through the material pump P102 to be pumped to the first reheating unit, namely, the first reheater H104 and then they are heated up to 220° C., then they go into the first molecular still H105 of the first distillation unit and are distributed evenly on the evaporation surface with the distributing device inside the first molecular still H105, and the temperature on the evaporation surface is 230° C., and the temperature of the second light component materials drops to 30° C. after the materials pass the condenser inside the first molecular still H105 and then flow to the second light-phase receiving tank V104 to be discharged through the material pump P105; and the second heavy component materials go into the second heavy-phase receiving tank directly, with the vacuum degree of the decoloration system 300 being within 0.5-1 Pa.

The second heavy component materials in the second heavy-phase receiving tank V103 go through the material pump P104 to be pumped to the second reheating unit, namely, the second reheater H108 and then they are heated up to 230° C., then they go into the second molecular still H109 of the second distillation unit and are distributed evenly on the evaporation surface with the distributing device inside the second molecular still H109, and the temperature on the evaporation surface is 280° C., and the temperature of the third light component materials drops to 30° C. after the materials pass the condenser inside the second molecular still H109 and then flow to the third light-phase receiving tank V106 to be pumped to the temporary storage tank through the material pump P107; and the third heavy component materials go into the third heavy-phase receiving tank V105 directly, with the vacuum degree of the first refinement system 400 being within 0.5-1 Pa.

The third heavy component materials in the third heavy-phase receiving tank V105 go through the material pump P106 to be pumped to the third reheating unit, namely, the third reheater H111 and then they are heated up to 230° C., then they go into the third molecular still H112 of the third distillation unit and are distributed evenly on the evaporation surface with the distributing device inside the third molecular still H112, and the temperature on the evaporation surface is 300° C., and the temperature of the fourth light component materials drops to 30° C. after the materials pass the condenser inside the third molecular still H112 and then flow to the fourth light-phase receiving tank V108 to be pumped to the temporary storage tank through the material pump P109; and the fourth heavy component materials go into the fourth heavy-phase receiving tank V107 directly, with the vacuum degree of the second refinement system 500 being within 0.1-1 Pa.

The fourth heavy component materials in the fourth heavy-phase receiving tank V107 go through the material pump P108 to be pumped to the fourth reheating unit, namely, the fourth reheater H114 and then they are heated up to 230° C., then they go into the fourth molecular still H115 of the fourth distillation unit and are distributed evenly on the evaporation surface with the distributing device inside the fourth molecular still H115, and the temperature on the evaporation surface is 310° C., and the temperature of the fifth light component materials drops to 30° C. after the materials pass the condenser inside the fourth molecular still H115 and then flow to the fifth light-phase receiving tank V110 to be pumped to the temporary storage tank through the material pump P111; and the fifth heavy component materials go into the fifth heavy-phase receiving tank V109 directly, with the vacuum degree of the third refinement system 600 being within 0.1-1 Pa.

The materials saved in the temporary storage tanks are all pumped to the winterization tank, heated up to 35° C. under the stirring status, and then crystallized in which process their temperature is lowered to 15° C. at a cooling rate of 2° C./h and then lowered to 3° C. at a cooling rate of 0.5° C./h. After that, grow crystal for 14 h at a constant temperature of 3° C., then a winterization filtering machine is used to filter them with a filtration pressure of 0.1 Mpa, and after the process of winterization degreasing, finished rice bran oil will be obtained, the appearance of which is limpid, transparent, and precipitate-free, and the determination results of each indicator are shown in Table 1.

TABLE 1

| Indicator analysis for finished rice bran oil | | | | | | | |
|---|---|---|---|---|---|---|---|
| Name | | Value | | | | | |
| Color | | R1.5, Y15 (133.4 mm slot) | | | | | |
| Oryzanol | Mass | 1.9 | | | | | |
| Composition of fatty acids | percent (%) | C16:0 16 | C18:0 2 | C18:1 45 | C18:2 34 | C18:3 2 | Others 1 |

Remarks: C16:0-palmitic acid; C18:0-stearic acid; C18:1-oleic acid; C18:2-linoleic acid; C18:3-linolenic acid.

Embodiment 2

As show in FIG. 2-6, the grade 4 rice bran oil containing 1.8% oryzanol passes through the preheating unit, namely, preheater H101, and the raw oil entering the system is heated up to 190° C. first, then it goes into the evaporation unit, namely, film evaporator H102, to be distributed evenly on the evaporation surface with the distributing device inside the film evaporator H102, with the temperature of the evaporation surface being at 220° C., and the temperature of the first light component materials drops to 45° C. after the materials pass the first condenser H103 of the first condensing unit, and then they flow to the first light-phase receiving tank V102, after which, they will be discharged through material pump P103, and the first heavy component materials go into the first heavy-phase receiving tank V101 directly, with the vacuum degree of the deacidification and deodorization system 200 being within 10-100 Pa.

The first heavy component materials in the first heavy-phase receiving tank V101 go through the material pump P102 to be pumped to the first reheating unit, namely, the first reheater H104 and then they are heated up to 230° C., then they go into the first molecular still H105 of the first distillation unit and are distributed evenly on the evaporation surface with the distributing device inside the first molecular still H105, and the temperature on the evaporation surface is 260° C., and the temperature of the second light component materials drops to 45° C. after the materials pass the condenser inside the first molecular still H105 and then flow to the second light-phase receiving tank V104 to be discharged through the material pump P105; and the second heavy component materials go into the second heavy-phase receiving tank V103 directly, with the vacuum degree of the decoloration system 300 being within 0.5-1 Pa.

The second heavy component materials in the second heavy-phase receiving tank V103 go through the material pump P104 to be pumped to the second reheating unit, namely, the second reheater H108 and then they are heated up to 260° C., then they go into the second molecular still H109 of the second distillation unit and are distributed evenly on the evaporation surface with the distributing device inside the second molecular still H109, and the temperature on the evaporation surface is 300° C., and the temperature of the third light component materials drops to 45° C. after the materials pass the condenser inside the second molecular still H109 and then flow to the third light-phase receiving tank V106 to be pumped to the temporary storage tank through the material pump P107; and the third heavy component materials go into the third heavy-phase receiving tank V105 directly, with the vacuum degree of the first refinement system 400 being within 0.5-1 Pa.

The third heavy component materials in the third heavy-phase receiving tank V105 go through the material pump P106 to be pumped to the third reheating unit, namely, the third reheater H111 and then they are heated up to 260° C., then they go into the third molecular still H112 of the third distillation unit and are distributed evenly on the evaporation surface with the distributing device inside the third molecular still H112, and the temperature on the evaporation surface is 310° C., and the temperature of the fourth light component materials drops to 45° C. after the materials pass the condenser inside the third molecular still H112 and then flow to the fourth light-phase receiving tank V108 to be pumped to the temporary storage tank through the material pump P109; and the fourth heavy component materials go into the fourth heavy-phase receiving tank V107 directly, with the vacuum degree of the second refinement system 500 being within 0.1-1 Pa.

The fourth heavy component materials in the fourth heavy-phase receiving tank V107 go through the material pump P108 to be pumped to the fourth reheating unit, namely, the fourth reheater H114 and then they are heated up to 260° C., then they go into the fourth molecular still H115 of the fourth distillation unit and are distributed evenly on the evaporation surface with the distributing device inside the fourth molecular still H115, and the temperature on the evaporation surface is 318° C., and the temperature of the fifth light component materials drops to 45° C. after the materials pass the condenser inside the fourth molecular still H115 and then flow to the fifth light-phase receiving tank V110 to be pumped to the temporary storage tank through the material pump P111; and the fifth heavy component materials go into the fifth heavy-phase receiving tank V109 directly, with the vacuum degree of the third refinement system 600 being within 0.1-1 Pa.

The materials saved in the temporary storage tanks are all pumped to the winterization tank, heated up to 35° C. under the stirring status, and then crystallized in which process their temperature is lowered to 15° C. at a cooling rate of 2° C./h and then lowered to 3° C. at a cooling rate of 0.5° C./h. After that, grow crystal for 14 h at a constant temperature of 3° C., then a winterization filtering machine is used to filter them with a filtration pressure of 0.1 Mpa, and after the process of winterization degreasing, finished rice bran oil will be obtained, the appearance of which is limpid, transparent, and precipitate-free, and the determination results of each indicator are shown in Table 2.

TABLE 2

| Indicator analysis for finished rice bran oil | | | | | | |
|---|---|---|---|---|---|---|
| Name | | Value | | | | |
| Color | | R1.6, Y16 (133.4 mm slot) | | | | |
| Oryzanol | Mass | 1.5 | | | | |
| Composition of fatty acids | percent (%) | C16:0 16.2 | C18:0 1.9 | C18:1 45 | C18:2 34 | C18:3 2 | Others 0.9 |

Remarks: C16:0-palmitic acid; C18:0-stearic acid; C18:1-oleic acid; C18:2-linoleic acid; C18:3-linolenic acid.

Embodiment 3

As show in FIG. 2-6, the grade 4 rice bran oil containing 2% oryzanol passes through the preheating unit, namely, preheater H101, and the raw oil entering the system is heated up to 175° C. first, then it goes into the evaporation unit, namely, film evaporator H102, to be distributed evenly on the evaporation surface with the distributing device inside the film evaporator H102, with the temperature of the evaporation surface being at 210° C., and the temperature of the first light component materials drops to 38° C. after the materials pass the first condenser H103 of the first condensing unit, and then they flow to the first light-phase receiving tank V102, after which, they will be discharged through material pump P103; and the first heavy component materials go into the first heavy-phase receiving tank V101 directly, with the vacuum degree of the deacidification and deodorization system 200 being within 10-100 Pa.

The first heavy component materials in the first heavy-phase receiving tank V101 go through the material pump P102 to be pumped to the first reheating unit, namely, the first reheater H104 and then they are heated up to 225° C., then they go into the first molecular still H105 of the first distillation unit and are distributed evenly on the evaporation surface with the distributing device inside the first molecular still H105, and the temperature on the evaporation surface is 245° C., and the temperature of the second light component materials drops to 38° C. after the materials pass the condenser inside the first molecular still H105 and then flow to the second light-phase receiving tank V104 to be discharged through the material pump P105; and the second heavy component materials go into the second heavy-phase receiving tank directly, with the vacuum degree of the decoloration system 300 being within 0.5-1 Pa.

The second heavy component materials in the second heavy-phase receiving tank V103 go through the material pump P104 to be pumped to the second reheating unit, namely, the second reheater H108 and then they are heated up to 245° C., then they go into the second molecular still H109 of the second distillation unit and are distributed evenly on the evaporation surface with the distributing device inside the second molecular still H109, and the temperature on the evaporation surface is 290° C., and the temperature of the third light component materials drops to 38° C. after the materials pass the condenser inside the second molecular still H109 and then flow to the third light-phase receiving tank V106 to be pumped to the temporary storage tank through the material pump P107; and the third heavy component materials go into the third heavy-phase receiving tank V105 directly, with the vacuum degree of the first refinement system 400 being within 0.5-1 Pa.

The third heavy component materials in the third heavy-phase receiving tank V105 go through the material pump P106 to be pumped to the third reheating unit, namely, the third reheater H111 and then they are heated up to 245° C., then they go into the third molecular still H112 of the third distillation unit and are distributed evenly on the evaporation surface with the distributing device inside the third molecular still H112, and the temperature on the evaporation surface is 305° C., and the temperature of the fourth light component materials drops to 38° C. after the materials pass the condenser inside the third molecular still H112 and then flow to the fourth light-phase receiving tank V108 to be pumped to the temporary storage tank through the material pump P109; and the fourth heavy component materials go into the fourth heavy-phase receiving tank V107 directly, with the vacuum degree of the second refinement system 500 being within 0.1-1 Pa.

The fourth heavy component materials in the fourth heavy-phase receiving tank V107 go through the material pump P108 to be pumped to the fourth reheating unit, namely, the fourth reheater H114 and then they are heated up to 245° C., then they go into the fourth molecular still H115 of the fourth distillation unit and are distributed evenly on the evaporation surface with the distributing device inside the fourth molecular still H115, and the temperature on the evaporation surface is 314° C., and the temperature of the fifth light component materials drops to 38° C. after the materials pass the condenser inside the fourth molecular still H115 and then flow to the fifth light-phase receiving tank V110 to be pumped to the temporary storage tank through the material pump P111; and the fifth heavy component materials go into the fifth heavy-phase receiving tank V109 directly, with the vacuum degree of the third refinement system 600 being within 0.1-1 Pa.

The materials saved in the temporary storage tanks are all pumped to the winterization tank, heated up to 35° C. under the stirring status, and then crystallized in which process their temperature is lowered to 15° C. at a cooling rate of 2° C./h and then lowered to 3° C. at a cooling rate of 0.5° C./h. After that, grow crystal for 14 h at a constant temperature of 3° C., then a winterization filtering machine is used to filter them with a filtration pressure of 0.1 Mpa, and after the process of winterization degreasing, finished rice bran oil will be obtained, the appearance of which is limpid, transparent, and precipitate-free, and the determination results of each indicator are shown in Table 3.

TABLE 3

| Indicator analysis for finished rice bran oil | | | | | | |
|---|---|---|---|---|---|---|
| Name | | Value | | | | |
| Color | | R1.4, Y14 (133.4 mm slot) | | | | |
| Oryzanol | Mass | 1.8 | | | | |
| Composition of fatty acids | percent (%) | C16:0 16.2 | C18:0 2.1 | C18:1 45 | C18:2 34 | C18:3 2 | Others 0.7 |

Remarks: C16:0-palmitic acid; C18:0-stearic acid; C18:1-oleic acid; C18:2-linoleic acid; C18:3-linolenic acid.

As determined by experiments, with production process conditions (such as temperature and vacuum degree) being changed only without changing the technical process, the oryzanol in refined rice bran oil takes up 0.5-2.0% in terms of mass percent, and in the composition of fatty acids, the saturated fatty acids take up 16-27%, and the unsaturated fatty acids take up 63.5-85%, and the composition of the oryzanol comprises 24-methylenecycloartanol ferulic acid ester, methylenecycloartanol ferulic acid ester, campesterol ferulic acid ester, cycloartanol ferulic acid ester, β-sterol ferulic acid ester, and cyclofurfuryl alcohol ferulic acid ester.

It shall be specified that the above embodiments are only used to state the technical proposal of the present application rather than limiting it. Although better embodiments are referenced in the detailed description of the present application, ordinary technical personnel in this field shall understand that it is available to modify the technical proposal of the present application or replace it with equivalent ones without going beyond the spirit and scope of the technical proposal of the present application, which should all be covered in the patent claims of the present application.

Having described some embodiments of the invention, additional embodiments will become apparent to those skilled in the art to which it pertains. While the particular methods, devices and systems described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention.

The invention claimed is:

1. An oil refining system, comprising:
a water circulation system, wherein the water circulation system comprises a chilled water circulation unit, a hot water circulation unit, and an ambient temperature water circulation unit, wherein the chilled water circulation unit comprises chilled water equipment and chilled water pipelines, and the chilled water equipment distributing the chilled water into a first chilled water pipeline, a second chilled water pipeline, and a third chilled water pipeline, the hot water circulation unit comprising hot water equipment and hot water pipelines, and the hot water equipment distributing the hot water to a first, a second, a third, and a fourth hot water pipelines, and the ambient temperature water circulation unit comprising ambient temperature water pipelines, the ambient temperature water pipelines comprising a first, a second, a third, a fourth, and a fifth ambient temperature water pipelines and an ambient temperature water loop;
a deacidification system;
a deodorization system, wherein each of the deacidification system and the deodorization system comprising a preheating unit, an evaporation unit, a first condensing unit, a first conduction oil pipeline and a second conduction oil pipeline; and
a decoloration system, wherein the decoloration system comprising a first reheating unit, a first distillation unit, a second condensing unit, a third conduction oil pipeline, and a fourth conduction oil pipeline, the chilled water in the first chilled water pipeline going into the first heat-exchange device, exchanging heat with the hot water coming from the first hot water pipeline to the first heat-exchange device, and then going back to the chilled water equipment for cyclic utilization; the chilled water in the second chilled water pipeline passing through the first condensing unit, condensing the gas generated inside it during the refining process, and going back to the chilled water equipment for cyclic utilization, and the chilled water in the third chilled water pipeline passing through the second condensing unit, condensing the gas generated inside it during the refining process, and going back to the chilled water equipment for cyclic utilization, the hot water in the first hot water pipeline going into the first heat-exchange device, exchanging heat with the chilled water coming from the first chilled water pipeline to the first heat-exchange device and then going back to the water equipment for cyclic utilization; the hot water of the second hot water pipeline passing through the second condensing unit, melting the solid materials generated inside it during the condensation of ambient temperature water into liquid, and going back to the hot water equipment for cyclic utilization after the liquid being drained; the hot water in the third hot water pipeline going to the first distillation unit, exchanging heat with the first light component materials generated inside the first distillation unit through distillation, and going back to the hot water equipment for cyclic utilization; and the hot water of the fourth hot water pipeline passing through the first condensing unit, melting the solid materials generated inside it during the condensation of ambient temperature water into liquid, and going back to the hot water equipment for cyclic utilization after the liquid being drained;
the ambient temperature water of the first ambient temperature water pipeline supplementing water for the hot water circulation unit after going into the hot water equipment; the ambient temperature water of the second ambient temperature water pipeline going back to the ambient temperature water loop after passing through the evaporation unit, the ambient temperature water of the third ambient temperature water pipeline going back to the ambient temperature water loop after passing through the first condensing unit, the ambient temperature water of the fourth ambient temperature water pipeline going back to the ambient temperature water loop after passing through the first distillation unit, and the ambient temperature water of the fifth ambient temperature water pipeline going back to the ambient temperature water loop after passing through the second condensing unit;
the conduction oil in the first conduction oil pipeline passing through the preheating unit, preheating the raw oil, and flowing back to the conduction oil furnace after heat exchange, the conduction oil of the second conduction oil pipeline passing through the evaporation unit, heating up materials inside it, and flowing back to the conduction oil furnace after heat exchange, the conduction oil in the third conduction oil pipeline passing through the first reheating unit, reheating the raw oil, and flowing back to the conduction oil furnace after heat exchange, the conduction oil of the fourth conduction oil pipeline passing through the first distillation unit, heating up materials inside it, and flowing back to the conduction oil furnace after heat exchange;
the raw oil going into the evaporation unit after being preheated inside the preheating unit and being separated into the first light component materials and the first heavy component materials, and then the first light component materials going into the first condensing unit, and the first heavy component materials going into the first reheating unit to be heated and separated into the second light component materials and the second heavy component materials after passing through the first distillation unit, and then, the non-condensed gas of the second light component materials going into the second condensing unit.

2. The oil refining system of claim 1, further comprising:
a first refinement system, wherein the first refinement system comprises a second reheating unit, a second distillation unit, a third condensing unit, a fifth conduction oil pipeline and a sixth conduction oil pipeline, the chilled water equipment distributing chilled water into a fourth chilled water pipeline, wherein the chilled water of this chilled water pipeline passing through the third condensing unit, condensing the gas generated inside it during the refining process, and going back to the chilled water equipment for cyclic utilization, the hot water equipment distributing the hot water to a fifth hot water pipeline, wherein the hot water in the fifth hot water pipeline going to the second distillation unit, exchanging heat with the second light component materials generated inside the second distillation unit through distillation, and going back to the hot water equipment for cyclic utilization, the ambient temperature water pipeline further comprising a sixth ambient temperature water pipeline, wherein the ambient temperature water of the sixth ambient temperature water pipeline going back to the ambient temperature water loop after passing through the second distillation unit, the conduction oil of the fifth conduction oil pipeline passing through the second reheating unit, reheating materials, and flowing back to the conduction oil furnace after heat exchange, the conduction oil of the sixth conduction oil pipeline passing through the second distillation unit, heating up materials inside it, and flowing back to the conduction oil furnace after heat exchange, the second heavy component materials going into the second reheating unit to be heated and being separated into the third light component materials and the third heavy component materials after passing through the second distillation unit, and then the non-condensed gas of the third light component materials going into the third condensing unit.

3. The oil refining system of claim 2, further comprising;

a second refinement system, wherein the second refinement system comprises a third reheating unit, a third distillation unit, a fourth condensing unit, a seventh conduction oil pipeline and an eighth conduction oil pipeline, the chilled water equipment also distributing chilled water into a fifth chilled water pipeline, wherein the chilled water of this chilled water pipeline passing through the fourth condensing unit, condensing the gas generated inside it during the refining process, and going back to the chilled water equipment for cyclic utilization, the hot water equipment also distributing the hot water to a sixth hot water pipeline, wherein the hot water in the sixth hot water pipeline going to the third distillation unit, exchanging heat with the third light component materials generated inside the third distillation unit through distillation, and going back to the hot water equipment for cyclic utilization, the ambient temperature water pipeline further comprising a seventh ambient temperature water pipeline, wherein the ambient temperature water of the seventh ambient temperature water pipeline going back to the ambient temperature water loop after passing through the third distillation unit, the conduction oil of the seventh conduction oil pipeline passing through the third reheating unit, reheating materials, and flowing back to the conduction oil furnace after heat exchange; the conduction oil of the eighth conduction oil pipeline passing through the third distillation unit, heating up materials inside it, and flowing back to the conduction oil furnace after heat exchange, the third heavy component materials going into the third reheating unit to be heated and being separated into the fourth light component materials and the fourth heavy component materials after passing through the third distillation unit, and then, the non-condensed gas of the fourth light component materials going into the fourth condensing unit.

4. The oil refining system of claim 3, further comprising:

a third refinement system, wherein the third refinement system comprising a fourth reheating unit, a fourth distillation unit, a fifth condensing unit, a ninth conduction oil pipeline and a tenth conduction oil pipeline, the chilled water equipment also distributing chilled water into a sixth chilled water pipeline, wherein the chilled water of this chilled water pipeline passing through the fifth condensing unit, condensing the gas generated inside it during the refining process, and going back to the chilled water equipment for cyclic utilization, the hot water equipment also distributing the hot water to a seventh hot water pipeline, wherein the hot water in the seventh hot water pipeline going to the fourth distillation unit, exchanging heat with the fourth light component materials generated inside the fourth distillation unit through distillation, and going back to the hot water equipment for cyclic utilization, the ambient temperature water pipeline further comprising an eighth ambient temperature water pipeline and a ninth ambient temperature water pipeline, wherein the ambient temperature water of the eighth ambient temperature water pipeline going back to the said ambient temperature water loop after passing through the fourth distillation unit, and the ambient temperature water of the ninth ambient temperature water pipeline going back to the 5-atd ambient temperature water loop after passing through the second heat-exchange device, the conduction oil of the ninth conduction oil pipeline passing through the fourth reheating unit, reheating materials, and flowing back to the conduction oil furnace after heat exchange, the conduction oil of the tenth conduction oil pipeline passing through the fourth distillation unit, heating up materials inside it, and flowing back to the conduction oil furnace after heat exchange, the fourth heavy component materials going into the fourth reheating unit to be heated and being separated into the fifth light component materials and the fifth heavy component materials after passing through the fourth distillation unit, and then, the non-condensed gas of the fifth light component materials going into the fifth condensing unit.

5. The oil refining system of claim 4, wherein each of the deacidification and the deodorization system further comprises a first vacuum device coupled to the first condensing unit, the decoloration system further comprising a second vacuum device coupled to the second condensing unit, the first refinement system further comprising a third vacuum device coupled to the third condensing unit, the second refinement system further comprising a fourth vacuum device coupled to the fourth condensing unit, and the third refinement system further comprising a fifth vacuum device coupled to the fifth condensing unit.

6. The oil refining system of claim 1, wherein the chilled water equipment comprises chilled water tank, a chilling unit, and an inner-loop chilled water pipeline, the chilled water tank being set with water supplement end and back-water end, the incoming water going into the chilled water tank through the water supplement end, and then the water inside the chilled water tank being chilled in the said chilling unit by passing through the inner-loop chilled water pipeline.

7. The oil refining system of claim 6, wherein the evaporation unit comprises a film evaporator and a first heavy-phase receiving tank, the conduction oil of the second conduction oil pipeline going into the film evaporator, heating up materials inside it, and flowing back to the conduction oil furnace after heat exchange, and the raw oil passing through the evaporation unit and being separated into the first light component materials and the first heavy component materials, and then the first heavy component materials going into the first heavy-phase receiving tank.

8. The oil refining system of claim 7, wherein the first condensing unit comprising a first condenser, a first cold trap, and a first light-phase receiving tank, wherein the first cold trap and the first condenser being coupled to each other, available to enhance the condensation of the first condenser, and at this moment, the third ambient temperature water pipeline branching into the first branch and the second branch of this pipeline, and the ambient temperature water of the first branch going into the first condenser and the raw oil being separated to get the first light component materials by going in the evaporation unit, then the water exchanging heat with such materials and condensing them into liquid, and going back to the ambient temperature water loop after the liquid going into the first light-phase receiving tank, the ambient temperature water of the second branch going back to the ambient temperature water loop after passing through the first cold trap, the hot water of the fourth hot water pipeline passing through the first condensing unit, then melting the solid materials generated inside it during the condensation of ambient temperature water into liquid, and going back to the hot water equipment for cyclic utilization after the liquid being drained, the chilled water in the second chilled water pipeline passing through the first cold trap, condensing the gas generated inside it during the refining process, and going back to the chilled water equipment for cyclic utilization.

9. The oil refining system of claim 8, wherein the first distillation unit comprising a first molecular still, a second heavy-phase receiving tank and a second light-phase receiving tank, and the conduction oil of the fourth conduction oil pipeline going into the first molecular still, heating up materials inside it, and flowing to the conduction oil furnace after heat exchange, and the raw oil passing through the distillation unit and being separated into the second heavy component materials and the second light component materials, which going into the second heavy-phase receiving tank and the second light-phase receiving tank respectively.

10. The oil refining system of claim 9, further comprising an auto-control system, wherein the auto-control system comprising a compressed air pipeline, a first pneumatic valve set on the first chilled water pipeline and before the heat-exchange device, a first sensing thermometer set on the hot water equipment, a second pneumatic valve set on the first conduction oil pipeline and before the preheating unit, a second sensing thermometer set on the preheating unit, a third pneumatic valve set on the second conduction oil pipeline and before the evaporation unit, a third sensing thermometer set on the evaporation unit, a fourth pneumatic valve set on the third conduction oil pipeline and before the first reheating unit, a fourth sensing thermometer set on the first reheating unit, a fifth pneumatic valve set on the fourth conduction oil pipeline and before the first distillation unit, and a fifth sensing thermometer set on the first distillation unit, the compressed air pipeline being coupled to the first, the second, the third, the fourth, and the fifth pneumatic valves respectively, all of which being started up with compressed air of the compressed air pipeline, the first, the second, the third, the fourth, and the fifth sensing thermometers being available to send signals, which being collected by the control device, and then the control device sending control instructions to the first, the second, the third, the fourth, and the fifth pneumatic valves as per the preset program for regulating the flow volume of chilled water and/or conduction oil and for controlling the temperature eventually.

* * * * *